(12) United States Patent
Cheng et al.

(10) Patent No.: US 12,047,990 B2
(45) Date of Patent: Jul. 23, 2024

(54) PERFORMING MEASUREMENTS ON DEACTIVATED SECONDARY CELLS

(71) Applicant: Qualcomm Incorporated, San Diego, CA (US)

(72) Inventors: Peng Cheng, Beijing (CN); Prashanth Haridas Hande, San Diego, CA (US); Prasad Reddy Kadiri, San Diego, CA (US); Arvind Vardarajan Santhanam, San Diego, CA (US); Huichun Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 17/435,595

(22) PCT Filed: Mar. 19, 2020

(86) PCT No.: PCT/CN2020/080125
§ 371 (c)(1),
(2) Date: Sep. 1, 2021

(87) PCT Pub. No.: WO2020/192540
PCT Pub. Date: Oct. 1, 2020

(65) Prior Publication Data
US 2022/0167358 A1 May 26, 2022

(30) Foreign Application Priority Data
Mar. 22, 2019 (WO) ................ PCT/CN2019/079343

(51) Int. Cl.
H04W 72/542 (2023.01)
H04W 52/52 (2009.01)
(Continued)

(52) U.S. Cl.
CPC ......... H04W 72/542 (2023.01); H04W 52/52 (2013.01); H04W 56/001 (2013.01); H04W 72/044 (2013.01); H04W 72/20 (2023.01)

(58) Field of Classification Search
None
See application file for complete search history.

(56) References Cited

U.S. PATENT DOCUMENTS 9,674,727 B2    6/2017  Damnjanovic et al.
2015/0009898 A1 1/2015  Rosa et al.
(Continued)

FOREIGN PATENT DOCUMENTS

CN   105940651 A   9/2016
CN   109391986 A   2/2019
(Continued)

OTHER PUBLICATIONS

Qualcomm Incorporated: "Solutions for Fast SCG and SCell Activation", 3GPP TSG-RAN WG1 #96, R1-1903028, Solutions for Fast SCG And SCell Activation, 3rd Generation Partnership Project (3GPP), Mobile Competence Centre, 650, Route Des Lucioles, F-06921, Sophia-Antipolis Cedex, FRA, vol. RAN WG1, No. Athens, Greece, Feb. 25, 2019-Mar. 1, 2019, Feb. 16, 2019, pp. 1-6, XP051600725, p. 2-p. 4.
(Continued)

Primary Examiner — Ayanah S George
(74) Attorney, Agent, or Firm — Holland & Hart LLP /Qualcomm Incorporated

(57) ABSTRACT

Methods, systems, and devices for wireless communication are described. Generally, the described techniques provide for efficiently performing measurements and other functions in preparation for communicating with a base station on a secondary cell (SCell). In particular, a user equipment (UE) may switch to a certain bandwidth part (BWP) (e.g., a
(Continued)

dormant BWP) on an SCell when the SCell is deactivated, and the UE may perform the appropriate measurements and functions on this BWP (e.g., based on reference signals received on this BWP). In some cases, the UE may determine to switch to the BWP for performing the appropriate measurements and functions based on an inactivity timer expiring or based on an indication from a base station (e.g., on a primary cell (PCell)). Accordingly, once the UE activates the SCell for communications with a base station, the latency associated with preparing for communicating on the SCell may be reduced.

30 Claims, 19 Drawing Sheets

(51) Int. Cl.
*H04W 56/00* (2009.01)
*H04W 72/044* (2023.01)
*H04W 72/20* (2023.01)

(56) References Cited

U.S. PATENT DOCUMENTS

| | | | |
|---|---|---|---|
| 2015/0215929 | A1 | 7/2015 | Damnjanovic et al. |
| 2015/0264592 | A1 | 9/2015 | Novlan et al. |
| 2017/0048917 | A1 | 2/2017 | Kim |
| 2018/0049186 | A1 | 2/2018 | Hong et al. |
| 2020/0037248 | A1 | 1/2020 | Zhou et al. |
| 2020/0052769 | A1 | 2/2020 | Cirik et al. |
| 2020/0404690 | A1* | 12/2020 | Lee .................. H04L 5/005 |
| 2021/0250156 | A1* | 8/2021 | Kim .................. H04W 72/53 |

FOREIGN PATENT DOCUMENTS

| | | | | |
|---|---|---|---|---|
| EP | 3598806 | A1 | 1/2020 | |
| EP | 3873126 | A1 * | 9/2021 | ........... H04L 5/0098 |
| WO | WO-2015108636 | | 7/2015 | |
| WO | WO-2015116353 | A1 | 8/2015 | |
| WO | WO-2019027242 | A1 | 2/2019 | |

OTHER PUBLICATIONS

Supplementary European Search Report—EP20776757—Search Authority—Munich—Nov. 15, 2022.

Ericsson: Summary of Efficient and low latency serving cell configuration/activation/setup 3GPP TSG RAN WG1 Meeting #96bis, R1-1905835, Xi'an, China, Apr. 8-12, 2019, Apr. 12, 2019, (Dec. 4, 2019), Sections 1-3, 12 Pages.

International Search Report and Written Opinion—PCT/CN2019/079343—ISA/EPO—Dec. 25, 2019.

International Search Report and Written Opinion—PCT/CN2020/080125—ISAEPO—May 27, 2020.

Qualcomm Inc: "Dormant BWP for Fast SCell Activation", 3GPP Draft, R2-1808570, Dormant BWP for Fast SCell Activation, 3rd Generation Partnership Project (3GPP), Mobile Competence Centre, 650, Route Des Lucioles, F-06921 Sophia-Antipolis Cedex, France, vol. RAN WG2, No. Busan, Korea, May 21, 2018- May 25, 2018, May 20, 2018 (May 20, 2018), XP051444827, 5 pages, Retrieved from the Internet: URL: http://www.3gpp.org/ftp/Meetings%5F3GPP%5FSYNC/RAN2/Docs/. [retrieved on May 20, 2018] the whole document.

Qualcomm: "Dormant BWP for Fast SCell Activation", 3GPP TSG-RAN WG2 Meeting #101, R2-1803564, Athens, Greece, Feb. 26-Mar. 2, 2018, Mar. 2, 2018 (Feb. 3, 2018), Sections 1-2, pp. 1-2.

Qualcomm: "Dormant BWP for fast SCell Activation", 3GPP TSG-RAN WG2 Meeting #101bis, R2-1805748, Sanya, China, Apr. 16-20, 2018, Apr. 20, 2018 (Apr. 20, 2018), Sections 1-2, pp. 1-2.

Qualcomm: "Dormant BWP for Fast SCell Activation", 3GPP TSG-RAN WG2 Meeting NR Ad-Hoc #1, R2-1801432, Vancouver, Canada, Jan. 22-26, 2018, Jan. 26, 2018 (Jan. 26, 2018), Sections 1-2, pp. 1-2.

Qualcomm Incorporated, et al., "Discussion on Fast SCell Activation Based on Measurements Prior to Activation in NR", 3GPP TSG RAN WG2 Meeting #106, R2-1905542, Reno, Nevada, US, May 13 - 17, 2019, May 17, 2019 (May 17, 2019), Sections 1-2, pp. 1-12, the whole document.

Qualcomm Incorporated: "Fast SCG and SCell Activation", 3GPP TSG-RAN WG1 #97, R1-1907306, Reno, USA, May 13, 2019-May 17, 2019, May 17, 2019 (May 17, 2019), Sections 1-2, pp. 1-11, the whole document.

Vivo: "Efficient Scell Activation", 3GPP TSG RAN WG1 #97, R1-1906184, Reno, USA, May 13-17, 2019, May 17, 2019, (May 17, 2019), Sections 1-2, pp. 1-4.

ZTE Corporation: "Discussion on Low Latency SCell Activation", 3GPP TSG RAN WG1 Meeting #96bis, R1-1904156, Xi'an, China, Apr. 8-12, 2019, Apr. 12, 2019 (Dec. 4, 2019), Sections 1-4, pp. 1-6.

ZTE Corporation: "Discussion on Low Latency SCell Activation", 3GPP TSG RAN WG1 Meeting #97, R1-1906422, Reno, USA, May 13-17, 2019, May 17, 2019 (May 17, 2019), Sections 1-2, pp. 1-6.

* cited by examiner

PERFORMING MEASUREMENTS ON DEACTIVATED SECONDARY CELLS

CROSS REFERENCE TO RELATED APPLICATIONS

The present Application is a 371 national stage filing of International Patent No. PCT/CN2020/080125 to CHENG et. al., titled "PERFORMING MEASUREMENTS ON DEACTIVATED SECONDARY CELLS," filed Mar. 19, 2020; and claims priority to International Patent Application No. PCT/CN2019/079343 to CHENG et. al., titled "PERFORMING MEASUREMENTS ON DEACTIVATED SECONDARY CELLS," filed Mar. 22, 2019, each of which is assigned to the assignee hereof, and each of which is expressly incorporated by reference in its entirety herein.

BACKGROUND

The following relates generally to wireless communications and more specifically to performing measurements on deactivated secondary cells (SCells).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may support communications between a UE and a base station on multiple aggregated carriers or cells (e.g., a primary cell (PCell) and one or more SCells), a feature referred to as carrier aggregation. In such systems, a UE may be configured to activate an SCell when appropriate to increase throughput, and the UE may be configured to deactivate the SCell otherwise. Improved techniques for activating and deactivating SCells may be desirable.

SUMMARY

The described techniques relate to improved methods, systems, devices, and apparatuses that support performing measurements on deactivated or activated secondary cells (SCells). Generally, the described techniques provide for efficiently performing measurements and other functions in preparation for communicating with a base station on an SCell. In particular, a user equipment (UE) may switch to a certain bandwidth part (BWP) (e.g., a dormant BWP) on an SCell, and the UE may perform the appropriate measurements and functions on this BWP (e.g., based on reference signals received on this BWP). In some cases, the UE may determine to switch to the BWP for performing the appropriate measurements and functions based on an inactivity timer expiring or based on an indication from a base station (e.g., on a primary cell (PCell)). Accordingly, once the UE activates the SCell for communications with a base station, the latency associated with preparing for communicating on the SCell may be reduced (e.g., since the UE may have already performed at least some measurements or functions in preparation for communicating with the base station on the SCell).

A method of wireless communication at a UE is described. The method may include communicating with a base station on a first BWP of a set of BWPs on an SCell, switching from the first BWP to a second BWP of the set of BWPs for performing channel state measurements, beam management, automatic gain control (AGC) maintenance, or master information block (MIB) reading on the SCell, and performing at least one of the channel state measurements, beam management, AGC maintenance, or MIB reading on the second BWP on the SCell.

An apparatus for wireless communication at a UE is described. The apparatus may include a processor, memory in electronic communication with the processor, and instructions stored in the memory. The instructions may be executable by the processor to cause the apparatus to communicate with a base station on a first BWP of a set of BWPs on an SCell, switch from the first BWP to a second BWP of the set of BWPs for performing channel state measurements, beam management, AGC maintenance, or MIB reading on the SCell based on the deactivating, and perform at least one of the channel state measurements, beam management, AGC maintenance, or MIB reading on the second BWP on the SCell.

Another apparatus for wireless communication at a UE is described. The apparatus may include means for communicating with a base station on a first BWP of a set of BWPs on an SCell, switching from the first BWP to a second BWP of the set of BWPs for performing channel state measurements, beam management, AGC maintenance, or MIB reading on the SCell based on the deactivating, and performing at least one of the channel state measurements, beam management, AGC maintenance, or MIB reading on the second BWP on the SCell.

A non-transitory computer-readable medium storing code for wireless communication at a UE is described. The code may include instructions executable by a processor to communicate with a base station on a first BWP of a set of BWPs on an SCell, switch from the first BWP to a second BWP of the set of BWPs for performing channel state measurements, beam management, AGC maintenance, or MIB reading on the SCell based on the deactivating, and perform at least one of the channel state measurements, beam management, AGC maintenance, or MIB reading on the second BWP on the SCell.

In some examples of the method, apparatuses, and non-transitory computer-readable medium described herein the SCell is in an activated state prior to switching to the second BWP. Some examples of the method, apparatuses, and non-transitory computer-readable medium described herein may further include operations, features, means, or instructions for determining that the UE is to deactivate the SCell prior to switching to the second BWP, and deactivating the SCell based at least in part on the determining, where deactivating the SCell comprises transitioning the SCell to a deactivated state.

In some examples of the method, apparatuses, and non-transitory computer-readable medium described herein, determining that the UE may be to deactivate the SCell may include operations, features, means, or instructions for determining that an inactivity timer for communicating on the first BWP of the SCell may have expired, and determining that the UE may be to deactivate the SCell based on the inactivity timer expiring. Some examples of the method, apparatuses, and non-transitory computer-readable medium described herein may further include operations, features, means, or instructions for starting the inactivity timer upon activating the SCell or switching to the first BWP, and stopping the inactivity timer during data transmissions on the first BWP of the SCell.

In some examples of the method, apparatuses, and non-transitory computer-readable medium described herein, determining that the UE may be to deactivate the SCell may include operations, features, means, or instructions for receiving a control message indicating that the UE may be to deactivate the SCell, and determining that the UE may be to deactivate the SCell based on the control message. In some examples of the method, apparatuses, and non-transitory computer-readable medium described herein, the control message further indicates that the UE may be to enter dormancy on the deactivated SCell, and where switching to the second BWP may include operations, features, means, or instructions for switching to the second BWP based on the control message indicating that the UE may be to enter dormancy on the deactivated SCell. In some examples of the method, apparatuses, and non-transitory computer-readable medium described herein, the control message includes a radio resource control (RRC) message or a medium access control (MAC) control element (CE).

In some examples of the method, apparatuses, and non-transitory computer-readable medium described herein, switching from the first BWP to the second BWP may include operations, features, means, or instructions for receiving, on a primary cell or a primary SCell from the base station, an indication to switch to the second BWP for performing the at least one of the channel state measurements, beam management, AGC maintenance, or MIB reading, and switching from the first BWP to the second BWP based on receiving the indication to switch to the second BWP. In some examples of the method, apparatuses, and non-transitory computer-readable medium described herein, switching from the first BWP to the second BWP may include operations, features, means, or instructions for autonomously switching from the first BWP to the second BWP.

In some examples of the method, apparatuses, and non-transitory computer-readable medium described herein, the SCell is deactivated before switching to the second BWP. Some examples of the method, apparatuses, and non-transitory computer-readable medium described herein may further include operations, features, means, or instructions for determining that the UE is to activate the SCell after performing the at least one of the channel state measurements, beam management, AGC maintenance, or MIB reading on the second BWP on the SCell, and activating the SCell based on the determining, where activating the SCell includes transitioning the SCell to an activated state. Some examples of the method, apparatuses, and non-transitory computer-readable medium described herein may further include operations, features, means, or instructions for receiving, on a primary cell or a primary SCell from the base station, an indication to switch to a first active BWP for communicating with the base station, and switching from the second BWP to the first active BWP based on receiving the indication to switch to the first active BWP, where the first active BWP may be the same as or different from the first BWP.

Some examples of the method, apparatuses, and non-transitory computer-readable medium described herein may further include operations, features, means, or instructions for autonomously switching from the second BWP to the first active BWP, where the first active BWP may be the same as or different from the first BWP. Some examples of the method, apparatuses, and non-transitory computer-readable medium described herein may further include operations, features, means, or instructions for determining that a measurement timer for performing the at least one of the channel state measurements, beam management, AGC maintenance, or MIB reading on the second BWP on the SCell may have expired, and refraining from performing further channel state measurements, beam management, AGC maintenance, or MIB reading on the second BWP based on the measurement timer expiring.

Some examples of the method, apparatuses, and non-transitory computer-readable medium described herein may further include operations, features, means, or instructions for starting the measurement timer upon switching to the second BWP. Some examples of the method, apparatuses, and non-transitory computer-readable medium described herein may further include operations, features, means, or instructions for receiving RRC signaling identifying the second BWP for performing the channel state measurements, beam management, AGC maintenance, or MIB reading. In some examples of the method, apparatuses, and non-transitory computer-readable medium described herein, the RRC signaling further indicates a configuration for performing the at least one of the channel state measurements, beam management, AGC maintenance, or MIB reading on the second BWP.

In some examples of the method, apparatuses, and non-transitory computer-readable medium described herein, the configuration indicates a periodicity for performing at least one of the channel state measurements or the beam management. Some examples of the method, apparatuses, and non-transitory computer-readable medium described herein may further include operations, features, means, or instructions for receiving a synchronization signal block or a channel state information reference signal on the second BWP after switching to the second BWP, and performing the channel state measurements, beam management, AGC maintenance, or MIB reading based on the synchronization signal block or the channel state information reference signal. In some examples of the method, apparatuses, and non-transitory computer-readable medium described herein, the first BWP includes a dedicated BWP, and the second BWP includes a dormant BWP.

Some examples of the method, apparatuses, and non-transitory computer-readable medium described herein may further include operations, features, means, or instructions for determining that the UE may be capable of performing channel state measurements, beam management, AGC maintenance, and MIB reading on the second BWP on the SCell, and performing the at least one of the channel state measurements, beam management, AGC maintenance, or MIB reading on the second BWP on the SCell based on the determining.

A method of wireless communication at a base station is described. The method may include communicating with a UE on a first BWP of a set of BWPs on an SCell, and transmitting, to the UE on a primary cell or a primary SCell, an indication for the UE to switch to a second BWP of the set of BWPs for performing at least one of channel state measurements, beam management, AGC maintenance, or MIB reading on the SCell.

An apparatus for wireless communication at a base station is described. The apparatus may include a processor, memory in electronic communication with the processor, and instructions stored in the memory. The instructions may be executable by the processor to cause the apparatus to communicate with a UE on a first BWP of a set of BWPs on an SCell, and transmit, to the UE on a primary cell or a primary SCell, an indication for the UE to switch to a second BWP of the set of BWPs for performing at least one of channel state measurements, beam management, AGC maintenance, or MIB reading on the SCell.

Another apparatus for wireless communication at a base station is described. The apparatus may include means for communicating with a UE on a first BWP of a set of BWPs on an SCell, and transmitting, to the UE on a primary cell or a primary SCell, an indication for the UE to switch to a second BWP of the set of BWPs for performing at least one of channel state measurements, beam management, AGC maintenance, or MIB reading on the SCell.

A non-transitory computer-readable medium storing code for wireless communication at a base station is described. The code may include instructions executable by a processor to communicate with a UE on a first BWP of a set of BWPs on an SCell, and transmit, to the UE on a primary cell or a primary SCell, an indication for the UE to switch to a second BWP of the set of BWPs for performing at least one of channel state measurements, beam management, AGC maintenance, or MIB reading on the SCell.

Some examples of the method, apparatuses, and non-transitory computer-readable medium described herein may further include operations, features, means, or instructions for determining that the SCell is to be deactivated, and transmitting a control message indicating that the UE is to deactivate the SCell and enter dormancy on the deactivated SCell based on the determining. In some examples of the method, apparatuses, and non-transitory computer-readable medium described herein, determining that the UE may be to deactivate the SCell may include operations, features, means, or instructions for determining that an inactivity timer for communicating on the first BWP of the SCell may have expired, and determining that the SCell may be to be deactivated based on the inactivity timer expiring. Some examples of the method, apparatuses, and non-transitory computer-readable medium described herein may further include operations, features, means, or instructions for starting the inactivity timer upon activating the SCell or switching to the first BWP, and stopping the inactivity timer during data transmissions on the first BWP of the SCell.

Some examples of the method, apparatuses, and non-transitory computer-readable medium described herein may further include operations, features, means, or instructions for determining that the UE may be to activate the SCell after performing the at least one of channel state measurements, beam management, AGC maintenance, or MIB reading on the second BWP on the SCell, and transmitting, to the UE on the primary cell or the primary SCell, another indication for the UE to switch to a first active BWP for communicating with the base station, where the first active BWP may be the same as or different from the first BWP. Some examples of the method, apparatuses, and non-transitory computer-readable medium described herein may further include operations, features, means, or instructions for transmitting RRC signaling identifying the second BWP on which the UE may be to perform the channel state measurements, beam management, AGC maintenance, or MIB reading.

In some examples of the method, apparatuses, and non-transitory computer-readable medium described herein, the RRC signaling further indicates a configuration for performing the at least one of the channel state measurements, beam management, AGC maintenance, or MIB reading on the second BWP. In some examples of the method, apparatuses, and non-transitory computer-readable medium described herein, the configuration indicates a periodicity for performing at least one of the channel state measurements or the beam management. In some examples of the method, apparatuses, and non-transitory computer-readable medium described herein, the first BWP includes a dedicated BWP, and the second BWP includes a dormant BWP. In some examples of the method, apparatuses, and non-transitory computer-readable medium described herein, the control message includes an RRC message or a medium access control (MAC) control element (CE). In some examples of the method, apparatuses, and non-transitory computer-readable medium described herein, the indication for the UE to switch to the second BWP may be included in downlink control information (DCI).

DETAILED DESCRIPTION

Some wireless communications systems may support communications between a user equipment (UE) and a base station on multiple aggregated carriers or cells (e.g., a primary cell (PCell) and one or more secondary cells (SCells)), a feature referred to as carrier aggregation. In such systems, a UE may be configured to activate an SCell when appropriate to increase throughput, and the UE may be configured to deactivate the SCell otherwise. In some cases, however, after activating an SCell for communicating with a base station, a UE may perform measurements and other functions in preparation for communicating on the SCell. Thus, the latency associated with communicating on an SCell after activation may be high.

Accordingly, in some systems (e.g., Long-Term Evolution (LTE) systems), a UE may be configured to enter a dormant state (e.g., different from an activated state and a deactivated state), and the UE may perform channel quality measurements in the dormant state before activating an SCell to limit the latency associated with communicating with a base station after SCell activation. In such systems, however, it may be challenging for the UE to manage transitioning between an activated state, deactivated state, and a dormant state (e.g., the process of transitioning between these states may be complex). But, without support for a dormant state for performing channel quality measurements, the latency associated with communicating with a base station on an SCell after SCell activation may be high.

As described herein, a UE may support efficient techniques for performing measurements and other functions in preparation for communicating with a base station on an SCell. In particular, the UE may switch to a certain bandwidth part (BWP) (e.g., a dormant BWP) on an SCell when the SCell is deactivated, and the UE may perform the appropriate measurements and functions on this BWP (e.g., based on reference signals received on this BWP). In some cases, the UE may determine to switch to the BWP for performing the appropriate measurements and functions based on an inactivity timer expiring or based on an indication from a base station (e.g., on a PCell). Using these techniques, once the UE activates the SCell for communications with a base station, the latency associated with preparing for communicating on the SCell may be reduced (e.g., since the UE may have already performed at least some measurements or functions in preparation for communicating with the base station on the SCell).

Aspects of the disclosure introduced above are described below in the context of a wireless communications system. Examples of processes and signaling exchanges that support performing measurements on deactivated SCells are then described. Aspects of the disclosure are further illustrated by and described with reference to apparatus diagrams, system diagrams, and flowcharts that relate to performing measurements on deactivated SCells.

Figure 1:
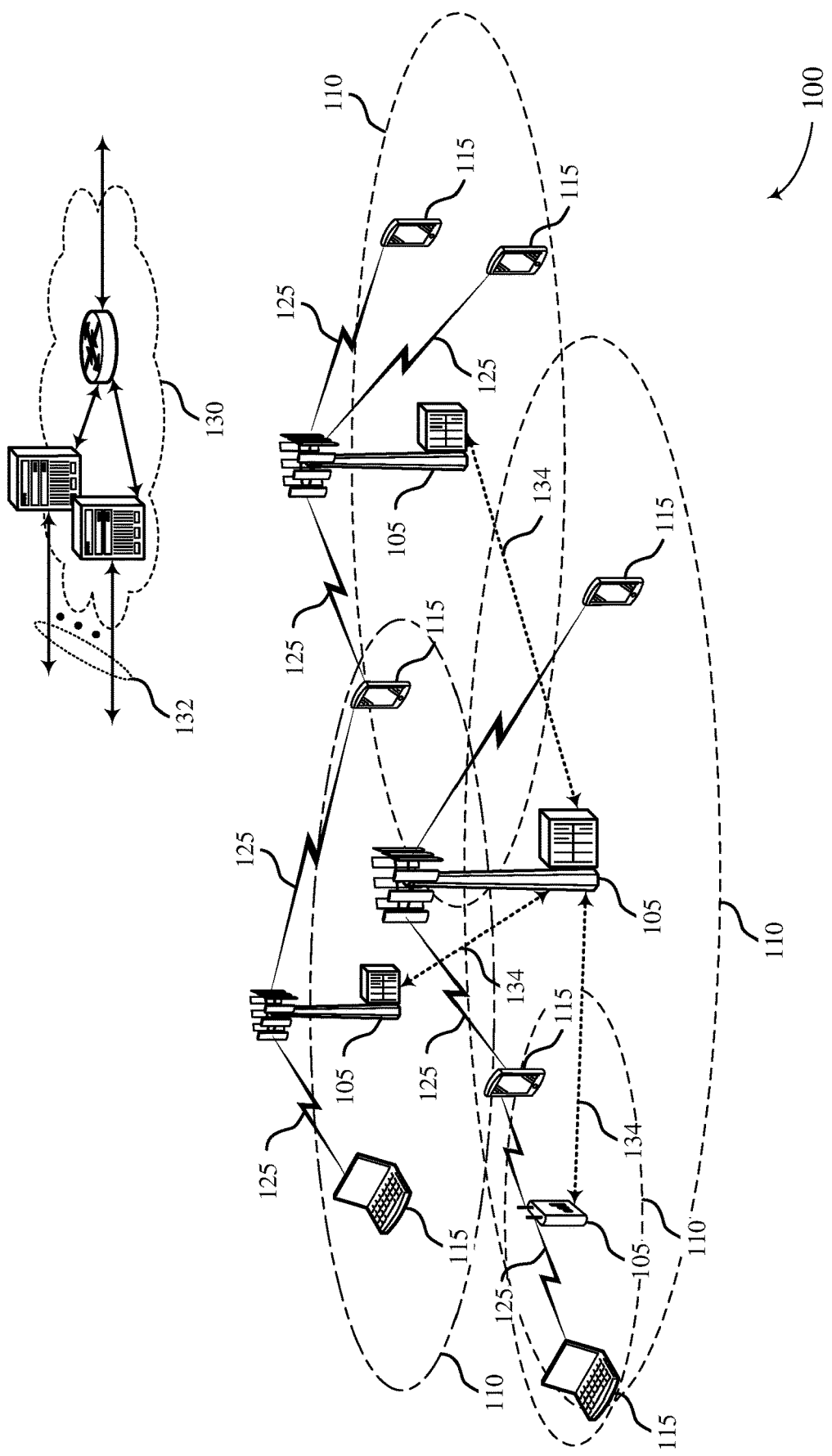
FIG. 1 illustrates an example of a wireless communications system that supports performing measurements on deactivated secondary cells (SCells) in accordance with aspects of the present disclosure.

FIG. 1 illustrates an example of a wireless communications system 100 that supports performing measurements on deactivated SCells in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., on a physical uplink control channel (PUCCH) or a physical uplink shared channel (PUSCH)) or downlink transmissions from a base station 105 to a UE 115 (e.g., on a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)) and may be positioned according to a channel raster for discovery by UEs 115. Carriers may be downlink or uplink (e.g., in a frequency division duplexing (FDD) mode) or be configured to carry downlink and uplink communications (e.g., in a time division duplexing (TDD) mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

As mentioned above, some wireless communications systems may support communications between a UE 115 and a base station 105 on multiple aggregated carriers or cells (e.g., a PCell and one or more SCells), a feature referred to as carrier aggregation. In such systems, a UE 115 may be configured to activate an SCell when appropriate to increase throughput, and the UE 115 may be configured to deactivate the SCell otherwise. In some cases, however, after activating an SCell for communicating with a base station 105, a UE 115 may perform measurements and other functions in preparation for communicating on the SCell. For instance, in some examples, a UE 115 may perform channel quality indicator (CQI) measurements, beam management, automatic gain control (AGC) maintenance, and/or master information block (MIB) reading before communicating on an SCell with a base station 105.

Accordingly, in some systems (e.g., LTE systems), a UE may be configured to enter a dormant state (e.g., transition an SCell to a dormant state which is different from an activated state or a deactivated state). The UE may then perform appropriate measurements and functions in the dormant state before activating an SCell to limit the latency associated with communicating with a base station on the SCell after activation.

Figure 2:
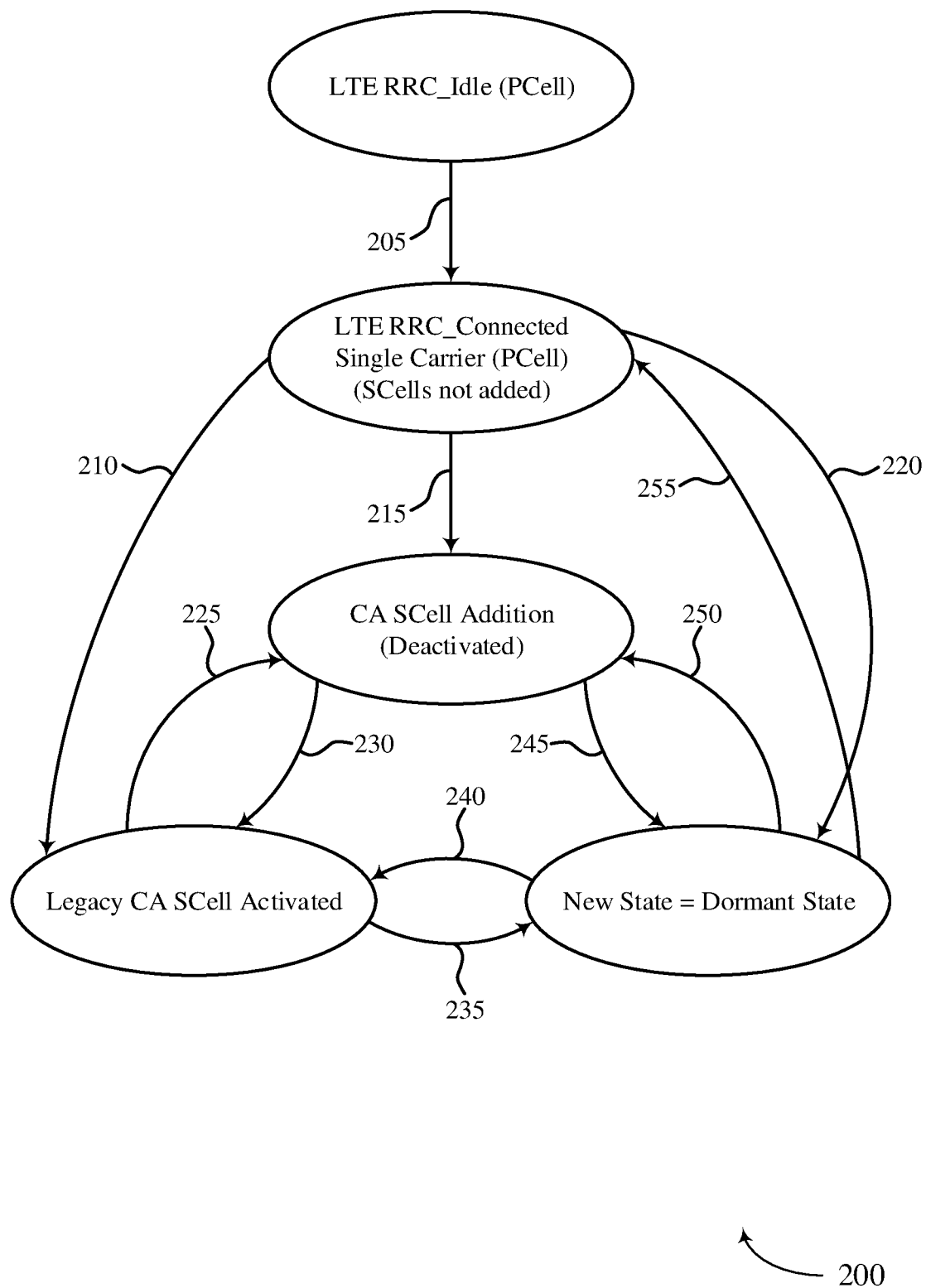
FIG. 2 illustrates an example of a flowchart showing the transitioning of an SCell between activated, deactivated, and dormant states in a Long-Term Evolution (LTE) system.

FIG. 2 illustrates an example of a flowchart 200 showing the transitioning of an SCell between activated, deactivated, and dormant states in an LTE system. At 205, a UE 115 may transition from an LTE RRC IDLE mode to an LTE RRC CONNECTED, such that the UE 115 may be connected for communicating with a base station 105 on a single carrier or PCell (e.g., with no SCells added). Subsequently, in some cases, at 210, the UE 115 may transition an SCell to an activated state (e.g., based on an RRC connection reconfiguration message indicating that the UE 115 is to add or transition the SCell to the activated state). In other cases, at 215, the UE 115 may transition the SCell to a deactivated state (e.g., based on an RRC connection reconfiguration message indicating that the UE 115 is to add or transition the SCell to the deactivated state). In yet other cases, at 220, the UE 115 may transition the SCell to a dormant state (e.g., based on an RRC connection reconfiguration message indicating that the UE 115 is to add or transition the SCell to the deactivated state).

If the SCell is in an activated state, a UE 115 may transition the SCell to a deactivated state (e.g., at 225, based on a MAC-CE indication, an SCell deactivation timer expiring, or a handover), or the UE 115 may transition the SCell to a dormant state (e.g., at 235, based on a MAC-CE indication or a dormant SCell timer expiring (SCellHibernationTimer)). Further, if the SCell is in a deactivated state, a UE 115 may transition the SCell to an activated state (e.g., at 230, based on a MAC-CE indication), or the UE 115 may transition the SCell to a dormant state (e.g., at 245, based on a MAC-CE indication). Similarly, if the SCell is in a dormant state, a UE 115 may transition the SCell to an activated state (e.g., at 240, based on a MAC-CE indication), or the UE 115 may transition the SCell to a deactivated state (e.g., at 250, based on a MAC-CE indication, an SCell deactivation timer expiring (dormantSCellDeactivationTimer), or a handover). In some cases, at 255, the UE 115 may even transition from a dormant state to being connected to a base station 105 on a single carrier or PCell (e.g., the UE 115 may release an SCell based on an RRC connection reconfiguration).

By supporting a dormant state for SCells in an LTE system (e.g., in accordance with FIG. 2), a UE 115 may be able to perform CQI measurements, for example, in the dormant state before activating an SCell (e.g., to limit the latency associated with communicating with a base station 105 on the SCell after activation). In addition, by supporting a dormant state for SCells in an NR system (e.g., in accordance with FIG. 2), a UE 115 may be able to perform CQI measurements, beam management, AGC maintenance, and MIB reading in the dormant state before activating an SCell (e.g., to limit the latency associated with communicating with a base station 105 on the SCell after activation). In some cases, however, it may be challenging for the UE 115 to manage transitioning SCells between an activated state, deactivated state, and a dormant state (e.g., the process of transitioning between these states may be complex). Further, because state transitions may be indicated by MAC-CEs, and BWP switching may be indicated by downlink control information (DCI) (e.g., fast DCI), there may be a bottleneck effect for state transitions. However, as described with reference to FIGS. 3-5, without support for a dormant state for performing channel quality measurements, the latency associated with communicating with a base station on an SCell after SCell activation may be high.

Figure 3:
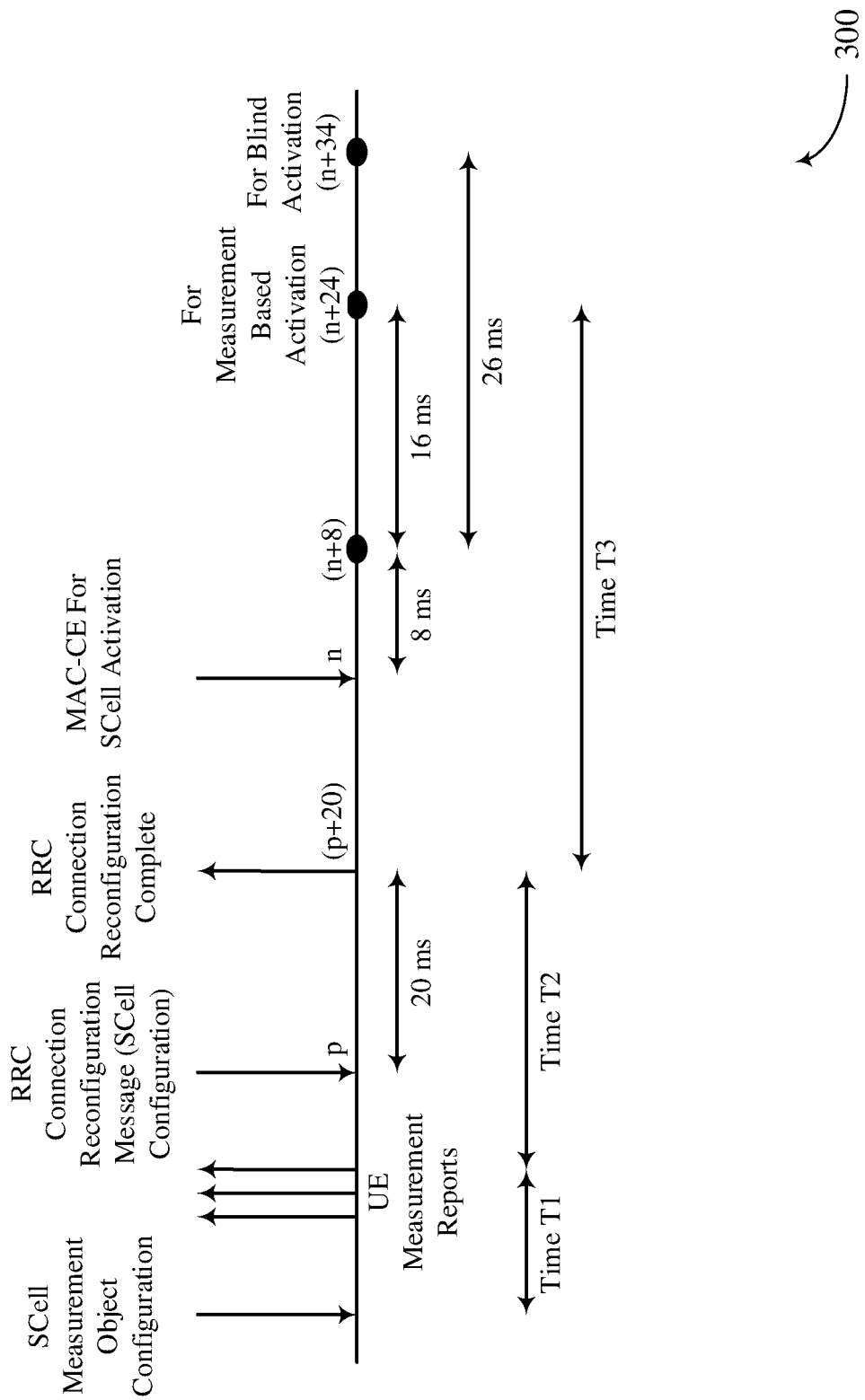
FIG. 3 illustrates an example of a timeline of procedures occurring before and after the activation of an SCell in an LTE system.

FIG. 3 illustrates an example of a timeline 300 of procedures occurring before and after the activation of an SCell in an LTE system. In the example of FIG. 3, a UE 115 may receive an SCell measurement object configuration for performing CQI measurements on an SCell, and the UE 115 may perform and report the measurements (e.g., cell-specific reference signal (CRS) based periodic CQI measurements and radio resource management (RRM) measurements) for the SCell to a base station 105 when the SCell is in a dormant state. The base station 105 may then use dormant state CQI reports to determine which SCells to activate. Accordingly, when the UE 115 transitions the SCell to an activated state (e.g., at time n), the UE 115 may be ready for communicating with the base station 105 8 ms (e.g., at time n+8) after activation (e.g., the base station 105 may start scheduling the UE 115 for communications immediately after activation). However, without support for the dormant state, the UE 115 would be unable to perform the CQI measurements before SCell activation. Thus, the UE 115 would perform the measurements after SCell activation, and the UE 115 would not be ready for communicating with the base station 105 until 24 ms after activation (e.g., resulting in an additional 16 ms of latency).

Figure 4:
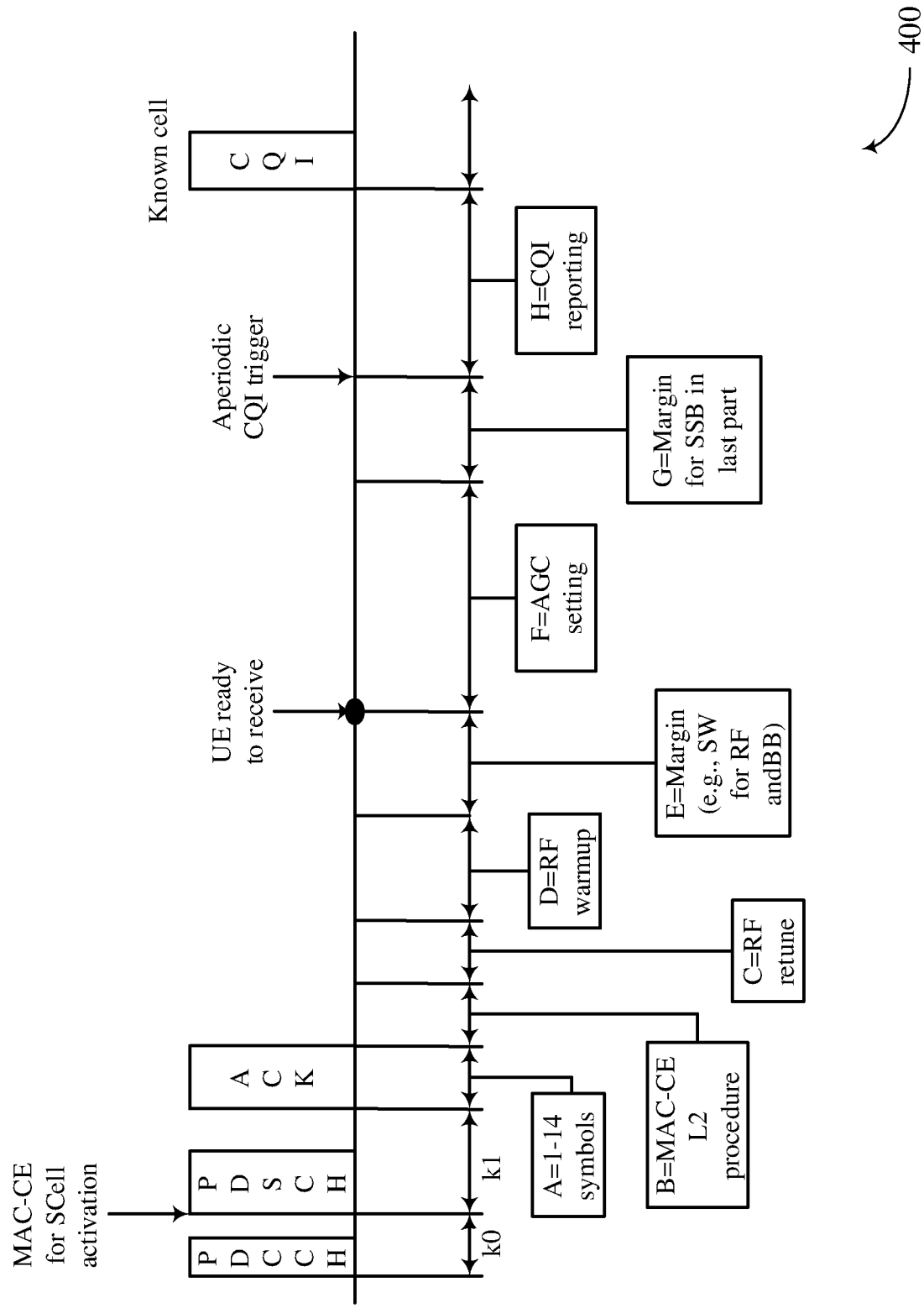
FIG. 4 illustrates an example of a timeline of procedures occurring before and after the activation of a known SCell in a New Radio (NR) system.

FIG. 4 illustrates an example of a timeline 400 of procedures occurring before and after the activation of a known SCell in an NR system (e.g., an SCell that a UE 115 has already identified based on a MIB). In the example of FIG. 4, a UE 115 may receive a MAC-CE for SCell activation, and the UE 115 may activate the SCell. However, before the UE 115 is scheduled for communicating on the SCell, the UE 115 may perform and report CQI measurements and perform certain other functions. Table 1 below illustrates the time taken to perform each of the processes illustrated in FIG. 4 in preparation for communicating with a base station 105 on an SCell (e.g., for communications using 15 kHz subcarrier spacing and 20 ms synchronization signal block (SSB) based measurement timing configuration (SMTC)).

TABLE 1

Processing times in preparation for communicating on SCell after activation

|  | k0 | k1 | A | B, C, D, E (L2 processing + RF warmup) | F | G | H | Sum |
|---|---|---|---|---|---|---|---|---|
| Min | 0 | 0 | 0.0714 ms | 3 ms | 1 SMTC | 2 ms | 1.57 ms | 27.57 ms |
| Max | 32 ms | 16 ms | 1 ms | 3 ms | 2 SMTC | 2 ms | 2.86 ms | 96.86 ms |

Thus, as shown in Table 1, the latency associated with preparing for communicating with a base station 105 on an SCell may be high (e.g., where the latency may be largely due to processes F and G, which may also include CQI warmup time). In particular, a UE 115 may wait to receive the appropriate reference signals (e.g., an SSB or a tracking reference signal (TRS), where the latency may be reduced if a TRS is used) to perform CQI measurements (e.g., in process G), and the UE 115 may perform AGC maintenance on an SCell (e.g., in process F) before communicating with a base station 105 on the SCell. The UE 115 may then report the CQI measurements. For instance, the UE 115 may report the CQI measurements in process H, where the latency may be reduced to 1.57 ms for process H (e.g., not including CQI warmup time) if aperiodic CQI reporting is used but may be at least 4 ms for process H if periodic CQI reporting is used.

Figure 5:
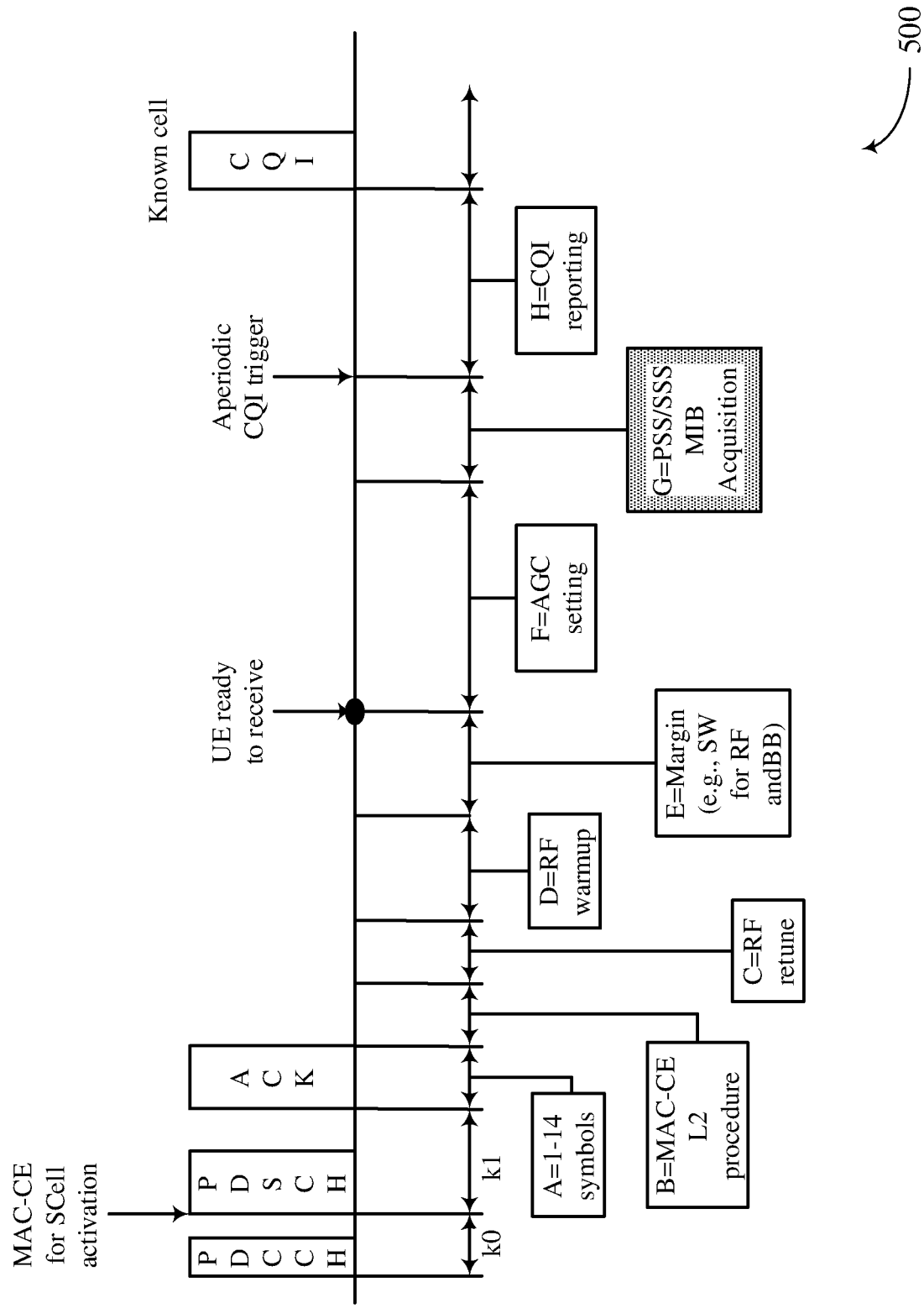
FIG. 5 illustrates an example of a timeline of procedures occurring before and after the activation of an unknown SCell in an NR system.

FIG. 5 illustrates an example of a timeline 500 of procedures occurring before and after the activation of an unknown SCell in an NR system (e.g., an SCell for which a UE 115 has not sent a valid measurement report after activation or for which an SSB is measured and is not detectable according to cell identification conditions). In the example of FIG. 5, a UE 115 may receive a MAC-CE for SCell activation, and the UE 115 may activate the SCell. However, before the UE 115 is scheduled for communicating on the SCell, the UE 115 may perform and report CQI measurements and perform certain other functions. In particular, the UE 115 may perform and report CQI measurements and perform the functions described with reference to FIG. 4, and the UE 115 may also perform other functions before being scheduled to communicate with a base station 105 on an SCell. For instance, the UE 115 may perform primary synchronization signal (PSS) and secondary synchronization signal (SSS) acquisition and MIB reading to identify the SCell before communicating on the SCell (e.g., in process G).

Thus, as described with reference to FIG. 3, for an SCell in an LTE system, the latency associated with communicating with a base station 105 on the SCell after activation may be high since the UE 115 may perform and report CQI measurements after activation before communicating with the base station 105 on the SCell. Further, as described with reference to FIGS. 4 and 5, for a known SCell and an unknown SCell in an NR system respectively, the latency associated with communicating with a base station 105 on the known SCell or the unknown SCell after activation may also be high since the UE 115 may perform and report CQI measurements and perform other functions after activation before communicating with the base station 105 on the SCell.

Figure 6:
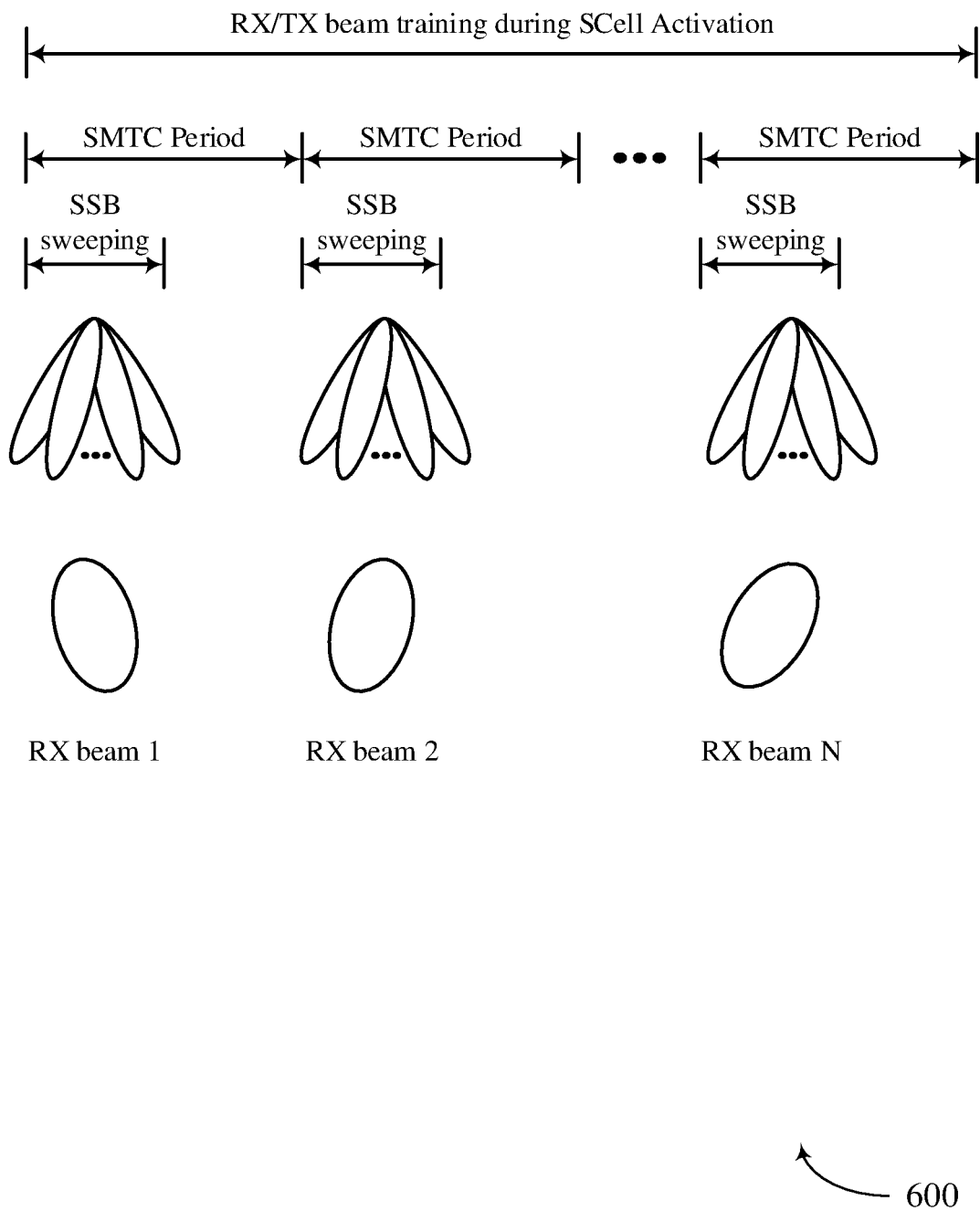
FIG. 6 illustrates an example of a beam management procedure in accordance with aspects of the present disclosure.

Further, for a high frequency system (e.g., FR 2 system), the latency associated with preparing for communicating with a base station 105 on an SCell may be even higher since a UE 115 may perform beam management prior to communicating with the base station 105 on the SCell. FIG. 6 illustrates an example of a beam management procedure 600 in accordance with aspects of the present disclosure. To keep track of which beams the UE 115 is to use, the UE 115 may perform beam management (e.g., receive beam sweeping) after the UE 115 is ready for PDCCH monitoring (e.g., to identify a suitable receive and transmit beam pair for synchronization and channel state information (CSI) measurements since the beam information may become invalid). Thus, as described with reference to FIGS. 3-6, the main latency contributors to NR SCell activation (e.g., different from LTE) include AGC, beam management (e.g., for FR2), and MIB reading (e.g., for an unknown SCell) based on SSB monitoring. Because SSB may be much sparser (e.g., 20 ms) than CRS (e.g., 1 ms TTI) in LTE, the NR SCell activation latency may be longer than LTE.

Accordingly, as described with reference to FIGS. 3-6, the latency associated with communicating with a base station 105 on an SCell after activation may be high since a UE 115 may perform various measurements and functions after SCell activation to prepare for communicating on the SCell with the base station 105. Thus, as described with reference to FIG. 2, a UE 115 may be configured to enter a dormant state (e.g., different from an activated state and a deactivated state), and the UE may perform and report CQI (or CSI) measurements and other functions in the dormant state before activating an SCell to limit the latency associated with communicating with a base station after SCell activation. In such systems, however, it may be challenging for the UE to manage transitioning between an activated state, deactivated state, and a dormant state (e.g., the process of transitioning between these states may be complex). But, without support for a dormant state for performing channel quality measurements, the latency associated with communicating with a base station on an SCell after SCell activation may be high. As described herein, UEs 115 in wireless communications system 100 may support efficient techniques for performing measurements and other functions in preparation for communicating with a base station on an SCell.

Figure 7:
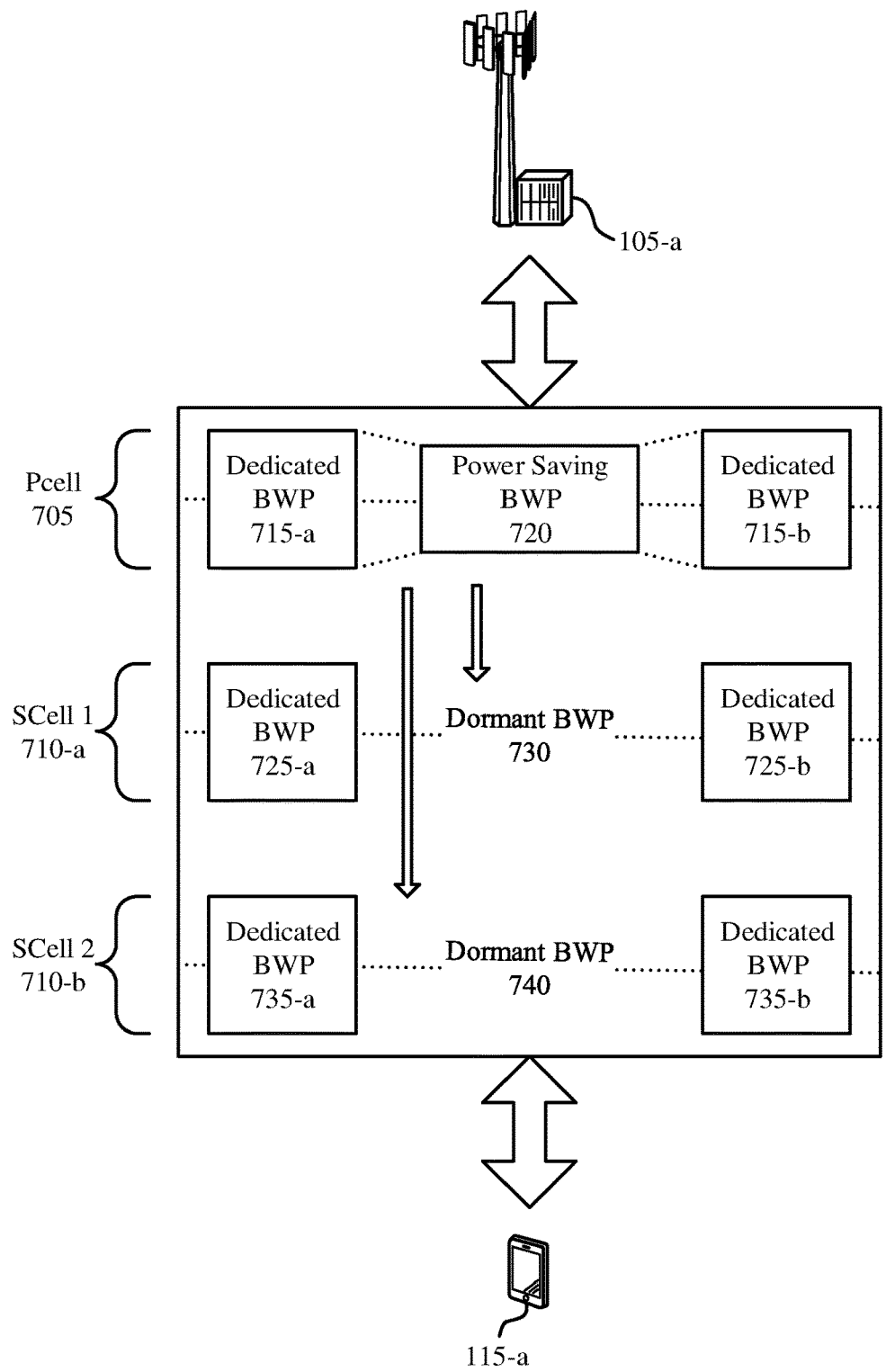
FIG. 7 illustrates an example of a wireless communications system that supports performing measurements on deactivated SCells in accordance with aspects of the present disclosure.

FIG. 7 illustrates an example of a wireless communications system 700 that supports performing measurements on deactivated SCells in accordance with aspects of the present disclosure. Wireless communications system 700 includes base station 105-a, which may be an example of a base station 105 described with reference to FIGS. 1-6. Wireless communications system 700 also includes UE 115-a, which may be an example of a UE 115 described with reference to FIGS. 1-6. As shown, base station 105-a may communicate with UE 115-a on multiple cells in a carrier aggregation configuration, the multiple cells including a PCell 705 (which may be an example of a PCell or a primary secondary cell (PSCell)), an SCell 710-a, and an SCell 710-b. Wireless communications system 700 may implement aspects of wireless communications system 100. For example, UE 115-a in wireless communications system 700 may support efficient techniques for performing measurements and other functions in preparation for communicating with base station 105-a on an SCell.

In particular, to limit the latency associated with preparing for communicating with base station 105-a on an SCell, UE 115-a may be configured to switch to a certain BWP (e.g., a dormant BWP) on an SCell when the SCell is deactivated, and UE 115-a may perform the appropriate measurements and functions on this BWP (e.g., based on reference signals received on this BWP). For instance, UE 115-a may switch from a dedicated BWP 725 to a dormant BWP 730 on SCell 710-a, and UE 115-a may switch from a dedicated BWP 735 to a dormant BWP 740 on SCell 710-b. In some cases, UE 115-a may also switch from a dedicated BWP 715 to a power saving BWP 720 on PCell 705. The appropriate measurements and functions described above may include channel state measurements (e.g., CQI measurements), beam management (e.g., beam failure detection and beam failure recovery if beam failure is detected), AGC maintenance, or MIB reading on the dormant BWP of the SCell. In some cases, if the active BWP (e.g., of the activated SCell) is a dormant BWP, the UE 115-a may stop monitoring the PDCCH or PDSCH on the SCell, but may continue performing CSI measurements, AGC, and beam management, if configured. A DCI may be used to control entering or leaving the dormant BWP for one or more SCells or one or more SCell groups.

After switching from a dedicated BWP 725 to the dormant BWP 730 on SCell 710-a or from a dedicated BWP 735 to the dormant BWP 740 on SCell 710-b, UE 115-a may perform the appropriate measurements and functions on the dormant BWP 730 on SCell 710-a and on the dormant BWP 740 on SCell 710-b. Accordingly, once the UE 115-a activates an SCell (e.g., SCell 710-a or SCell 710-b) for communications with base station 105-a (e.g., transitions to a dedicated BWP for communicating with base station 105-a), the latency associated with preparing for communicating on the SCell 710 may be reduced (e.g., since UE 115-a may have already performed at least some measurements or functions in preparation for communicating with base station 105-a on the SCell 710). Further, because UE 115-a may switch to the dormant BWP, UE 115-a may not support a dormant state for SCells, and the complexity associated with managing the state transitions of SCells may be reduced.

In some aspects, UE 115-a may determine to deactivate an SCell and switch to a dormant BWP from a dedicated BWP (or active BWP) on an SCell for performing appropriate measurements and functions based on an inactivity timer expiring (e.g., where the inactivity timer keeps track of inactivity on the dedicated BWP on the SCell). In such aspects, UE 115-a may start the inactivity timer upon activating the SCell for communicating on the dedicated BWP, and UE 115-a may stop the inactivity timer during data transmissions on the dedicated BWP on the SCell. Then, once the inactivity timer expires, UE 115-a may switch (or fall back) to the dormant BWP in the SCell for performing the appropriate measurements and functions in preparation for communicating on the SCell again when the SCell is reactivated. In some cases, the inactivity timer for switching from a dedicated BWP to a dormant BWP may be different from a BWP inactivity timer (e.g., where a UE 115 is configured to switch to a default BWP after the BWP inactivity timer expires). In other cases, the inactivity timer for switching from a dedicated BWP to a dormant BWP may be the same as a BWP inactivity timer (i.e., UE 115-a may reuse the BWP inactivity timer as the inactivity timer for switching from a dedicated BWP to a dormant BWP). In such other cases, the dormant BWP may be the same as a default BWP.

In other aspects, UE 115-a may determine to deactivate an SCell and switch to a dormant BWP from a dedicated BWP (or active BWP) on an SCell for performing appropriate measurements and functions based on signaling from base station 105-a. In such aspects, base station 105-a may transmit (and UE 115-a may receive) a control message (e.g., RRC message or MAC-CE) indicating that the UE 115-a is to deactivate an SCell, and UE 115-a may deactivate the SCell based on the control message.

In some cases, the control message may also indicate whether UE 115-a is to enter a dormancy mode or a deactivated mode (e.g., where UE 115-a may be in the dormancy mode or deactivated mode for monitoring BWPs while the SCell is deactivated). In such cases, if the control message indicates that UE 115-a is to enter the dormant mode on the deactivated SCell, UE 115-a may autonomously switch to the dormant BWP (implicit switching), or UE 115-a may receive DCI from base station 105-a (e.g., on PCell 705) indicating that UE 115-a is to switch to the dormant BWP. Thus, the DCI may be used to control entering or leaving the dormant BWP for one or more SCells or one or more SCell groups. UE 115-a may then perform CQI measurements, beam management, AGC maintenance, or MIB reading on the dormant BWP of the SCell. Alternatively, if the control message indicates that UE 115-a is to enter the deactivated mode on the deactivated SCell, UE 115-a may autonomously switch to a first active BWP, or UE 115-a may receive DCI from base station 105-a (e.g., on PCell 705) indicating that UE 115-a is to switch to the first active BWP. In this case, UE 115-a may not be expected to transmit or receive data or control information or perform any measurements on the first active BWP when the SCell is deactivated (e.g., although the configuration for performing measurements or other functions may be there).

Using these techniques, base station 105-a may quickly (e.g., dynamically) indicate to UE 115-a to switch between a dormant BWP and dedicated BWPs when an SCell is deactivated (e.g., using the cross-carrier BWP switch indication transmitted on a PCell 705). Thus, UE 115-a may continue monitoring a downlink control channel on PCell 705 when an SCell is deactivated (e.g., but UE 115-a may not monitor a downlink control channel on the dormant BWP of a deactivated SCell when UE 115-a is in a dormancy mode).

In some examples, when a base station 105-a or UE 115-a determines to activate a deactivated SCell, base station 105-a may transmit (and UE 115-a may receive) another control message (e.g., RRC message or MAC-CE) indicating that the UE 115-a is to activate the SCell. The UE 115-a may then activate the SCell based on the control message (e.g., regardless of whether UE 115-a was in a dormancy or deactivated mode when the SCell was deactivated). In such examples, UE 115-a may autonomously switch to the first active BWP (e.g., if the UE 115-a is not already tuned to the first active BWP), or UE 115-a may receive DCI from base station 105-a (e.g., on PCell 705) indicating that UE 115-a is to switch to the first active BWP. If the base station 105-a explicitly transmits DCI on PCell 705 indicating that UE 115-a is to switch to the first active BWP (e.g., cross carrier BWP switching), the DCI may indicate the SCell and the first active BWP to which UE 115-a is to switch (e.g., PCell 705 performs cross carrier scheduling), or the DCI may indicate the first active BWP to which UE 115-a is to switch, and UE 115-a may identify the SCell (e.g., the index of the SCell) based on the control message used to activate the SCell.

In the above aspects, UE 115-a may switch to the dormant BWP on an SCell for performing CQI measurements, beam management, AGC maintenance, or MIB reading such that the UE 115-a may be ready for communicating with base station 105-a on the SCell sooner after activation. In these examples, UE 115-a may not transmit or receive data transmissions on the dormant BWP on the SCell, and one dormant BWP may be configured in each deactivated SCell. In some cases, the dormant BWP for an SCell (e.g., the BWP configured without PDSCH or PDCCH) may be configured via RRC signaling. Further, UE 115-a may be configured to perform periodic CQI measurements, receive reference signals for performing beam management, and receive periodic TRSs for performing AGC maintenance on the dormant BWP.

Accordingly, UE 115-a may perform CQI measurements, beam management, AGC maintenance, or MIB reading on a dormant BWP of a deactivated SCell (e.g., an SCell in a deactivated state, such that no new states are introduced), and UE 115-a may not perform such measurements or functions on other (e.g., dedicated) BWPs of an SCell when the SCell is deactivated. Further, UE 115-a may not perform uplink or downlink data transmissions on these other BWPs of the SCell when the SCell is deactivated (e.g., no uplink or downlink grants are allowed on the dormant BWP and the other BWPs when the SCell is deactivated). In some cases, UE 115-a may be configured separately for performing measurements and/or other functions on the dormant BWP (e.g., with different configurations for a dormant BWP and dedicated BWPs on an SCell). For instance, a periodic CQI measurement configuration and beam management configuration for a dormant BWP may be different from the same configurations for a dedicated BWP. Further, periodic CQI measurements and beam management may be configured based on an SSB or a CSI-RS (e.g., where an SSB is preferred to simultaneously perform CQI measurements, beam management, and AGC maintenance on an SCell, to reduce power consumption at a UE 115-a).

In some cases, once UE 115-a switches to a dormant BWP, UE 115-a may perform CQI measurements, beam management, AGC maintenance, or MIB reading for a configured duration. Specifically, UE 115-a may start a measurement timer upon receiving a control message (e.g., RRC message or MAC-CE) indicating that the UE 115-a is to deactivate the SCell or upon switching to a dormant BWP from a dedicated BWP in a deactivated SCell. The UE 115-a may then perform CQI measurements, beam management, AGC maintenance, or MIB reading on a dormant BWP of the SCell until (e.g., before) the measurement timer expires. In some cases, the measurement timer may also be used to provide a configured duration for performing measurements and other functions on other BWPs (e.g., other than the dormant BWP). The value of the measurement timer may be configured in RRC signaling or indicated in the same control message used for SCell deactivation. Once the measurement timer expires, UE 115-*a* may determine whether to continue performing CQI measurements, beam management, AGC maintenance, or MIB reading based on the configuration at the UE 115-*a*. In some aspects, UE 115-*a* refrain from performing CQI measurements, beam management, AGC maintenance, or MIB reading after the timer expires. Further, if UE 115-*a* receives a control message for activation of an SCell, and a measurement timer is still running on the SCell, UE 115-*a* may stop the timer and prepare for CQI reporting.

Figure 8:
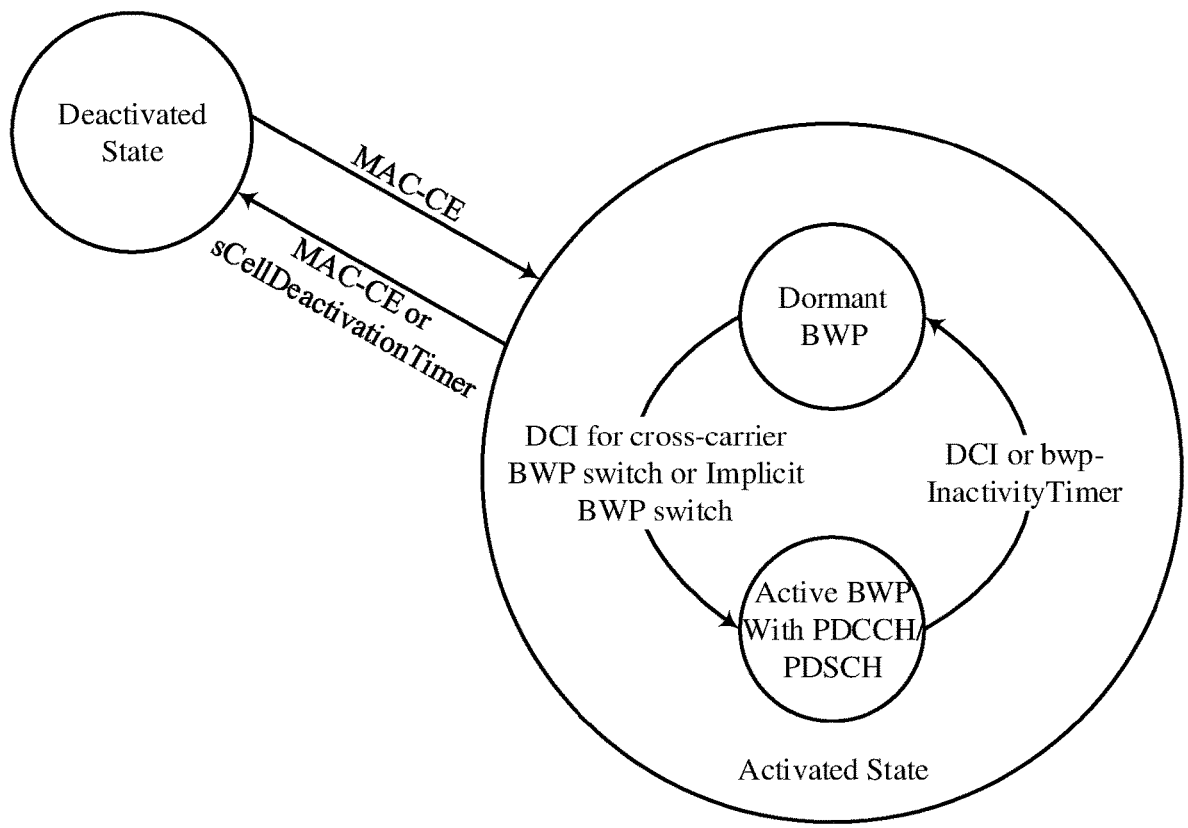
FIG. 8 illustrates an example of a state diagram showing bandwidth part (BWP) switching in an activated SCell in accordance with aspects of the present disclosure.

Although the examples described above are primarily related to switching to a dormant BWP on an SCell after deactivating the SCell, the UE 115-*a* may also be configured to switch to a dormant BWP without deactivating an SCell (e.g., in an activated state). FIG. 8 illustrates an example of a state diagram 800 showing BWP switching in an activated SCell (e.g., an SCell in an activated state) in accordance with aspects of the present disclosure. In the example of FIG. 8, the UE 115-*a* may communicate with the base station 105-*a* (e.g., receive PDCCHs and PDSCHs) on an SCell on a dedicated or active BWP. Then, after an inactivity timer expires or after receiving DCI indicating that the UE 115-*a* is to switch to a dormant BWP, the UE 115-*a* may switch to the dormant BWP. The UE 115-*a* may then perform CQI measurements, beam management, AGC maintenance, or MIB reading on the dormant BWP of the SCell (e.g., the activated SCell). When the UE 115-*a* decides to continue communicating with the base station 105-*a* (e.g., autonomously or based on receiving DCI for a cross-carrier BWP switch or implicit BWP switch), the UE 115-*a* may transition to an active BWP for communicating with the base station 105-*a*.

Figure 9:
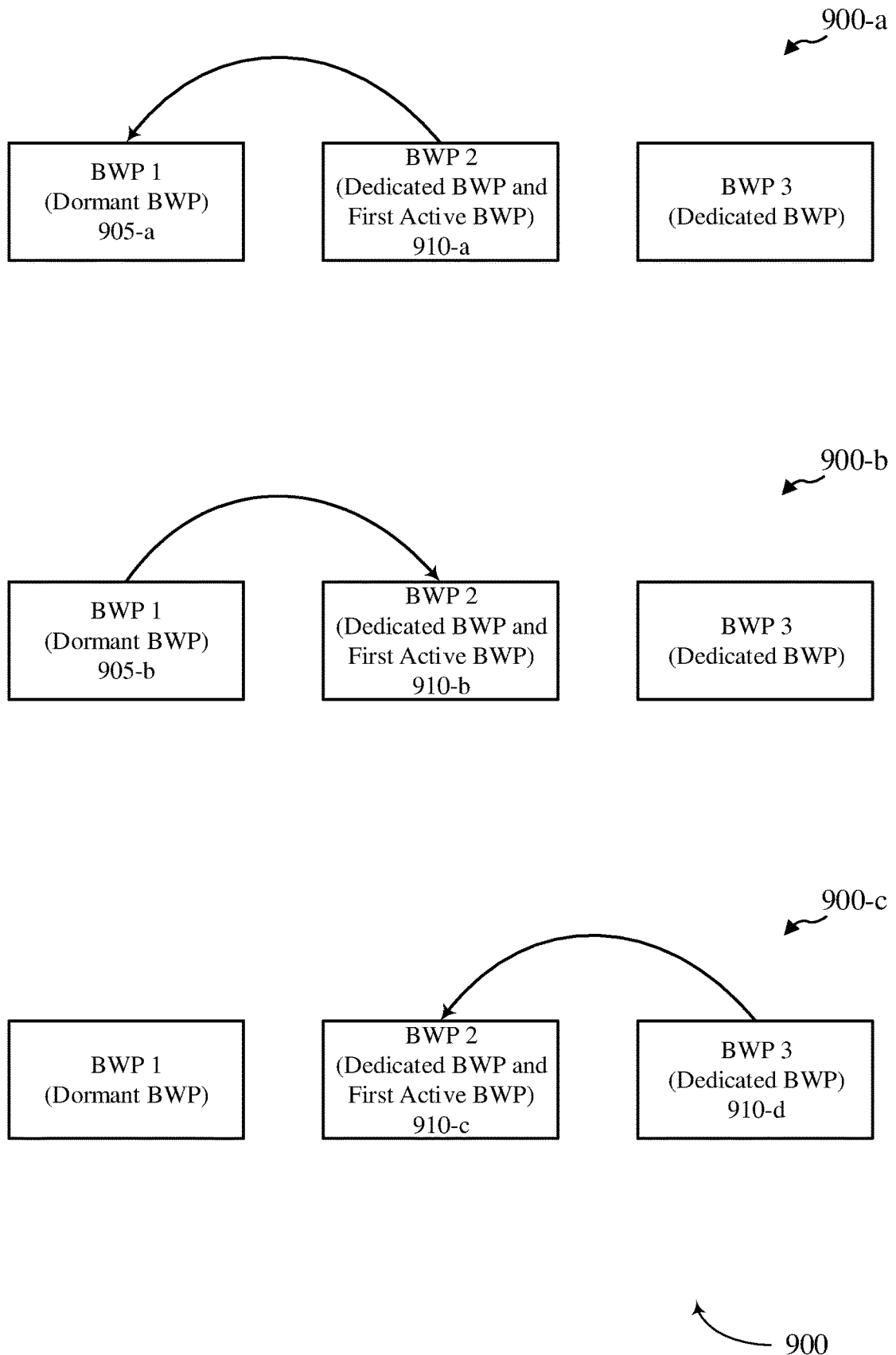
FIG. 9 illustrates an example of BWP switching in accordance with aspects of the present disclosure.

FIG. 9 illustrates an example of BWP switching 900 in accordance with aspects of the present disclosure. In the examples described below, a UE 115 may be configured to perform CQI measurements, beam management, AGC maintenance, or MIB reading on a dormant BWP based on a configuration for the dormant BWP provided by a base station 105. The configuration may be an RRM configuration or CSI configuration indicating reference signals for performing these measurements and functions with a reduced duty cycle or periodicity. Further, the UE 115 may refrain from performing uplink or downlink data transmissions on the dormant BWP (e.g., no PDCCH, PDSCH, and/or PUSCH transmissions). Additionally, when an SCell is activated, the UE 115 may be configured to communicate with a base station 105 on any of the dedicated BWPs of an SCell (e.g., including PDCCH, PDSCH, and/or PUSCH transmissions with an optional CSI configuration and RRM configuration for performing measurements and other functions). When an SCell is deactivated, however, a UE 115 may refrain from performing uplink or downlink data transmissions on dedicated BWPs of the SCell (e.g., no PDCCH, PDSCH, and/or PUSCH transmissions), and the UE 115 may refrain from performing CQI measurements, beam management, AGC maintenance, or MIB reading on the dedicated BWPs.

In a first example 900-*a*, a UE 115 may be communicating with a base station 105 on a dedicated BWP 910-*a* of an SCell, and the UE 115 may receive a control message indicating that the UE 115 is to deactivate the SCell. In this example, the control message may also indicate that the UE 115 is to enter a dormancy mode. Accordingly, the UE 115 may switch (e.g., autonomously or based on DCI) from the dedicated BWP 910-*a* to the dormant BWP 905-*a* for performing CQI measurements, beam management, AGC maintenance, and MIB reading. In another example, if the control message indicates that the UE 115 is to enter a deactivated mode, the UE 115 may remain tuned to the dedicated BWP 910-*a*, and the UE 115 may not be expected to perform uplink or downlink data transmissions or perform measurements or other functions on the dedicated BWP 910-*a*.

In a second example 900-*b*, a UE 115 may be tuned to (e.g., monitoring) a dormant BWP 905-*b* of a deactivated SCell (e.g., in a dormancy mode), and the UE 115 may receive a control message indicating that the UE 115 is to activate the SCell. Accordingly, the UE 115 may switch (e.g., autonomously or based on DCI) from the dormant BWP 905-*b* to the dedicated BWP 910-*b* (i.e., the first active BWP) for communicating with a base station 105. In a third example 900-*c*, a UE 115 may be tuned to a dedicated BWP 910-*d* of a deactivated SCell (e.g., in a deactivated mode), and the UE 115 may receive a control message indicating that the UE 115 is to activate the SCell. Accordingly, since the UE 115 may be tuned to a dedicated BWP different from the first active BWP, the UE 115 may switch (e.g., autonomously or based on DCI) from the dedicated BWP 910-*d* to the dedicated BWP 910-*c* (i.e., the first active BWP). Alternatively, if the UE 115 was tuned to the dedicated BWP 910-*c* (i.e., the first active BWP), the UE 115 may not switch BWPs.

Using the techniques described herein, a UE 115 may be able to reduce the latency associated with preparing for communicating with a base station 105 on an SCell while maximizing power savings at the UE 115. A dormant BWP on an SCell may allow a UE 115 to perform continuous CQI estimation and reporting even when no PDCCH or PDSCH is monitored, so that a network can schedule the UE 115 for communications at time n+8 upon SCell activation form an SCell dormant state. Compared with a deactivated state, an additional small delta or UE power consumption may be expected due to the CSI measurement and reporting (e.g., as a function of CSI reporting periodicity), but the techniques may help to significantly reduce power consumption compared to an SCell active state. In some cases, a separate CSI reporting cycle may be configured to balance the UE power consumption and latency reduction. For bursty traffic applications, by performing fast state transitions between active and dormant states, a UE 115 may reduce power consumption along with latency (e.g., since the UE 115 may avoid transitioning states, but may instead switch to and from a dormant BWP).

In NR, dormancy may be useful to reduce SCell activation latency. In particular, the time-consuming parts (e.g., AGC, initial CQI warmup, beam management, and MIB reading) may also be performed when the UE does not monitor PDCCH or PDSCH, to reduce SCell activation latency. Note that AGC, initial CQI warmup, beam management, and MIB reading may all be performed based on an SSB. Thus, a separate SMTC monitoring cycle may also be configured to balance the UE power consumption and latency reduction. Further, note that introducing dormancy behavior does not correspond to introducing an SCell dormant state. One issue of a dormant SCell is the state transition based on MAC-CE. The state transition would be based on a MAC-CE and procedures in the MAC layer. As described herein, the dormancy behavior achieved at the BWP level may be supported without introducing an SCell dormant state.

Specifically, the dormant BWP may be one particular BWP (e.g., without PDCCH or PDSCH configuration) that is configured in RRC. Further, no new SCell state (e.g., SCell dormant state) may be introduced, and no MAC-CE state transition may be supported for such a state. Instead, the state transitions in the dormant BWP framework are shown in FIG. 8 and in Table 2 below.

TABLE 2

State transitions in the dormant BWP framework

| | To From | | |
|---|---|---|---|
| | Activated state | Deactivated state | Dormancy (dormant BWP) |
| Activated state | | Legacy signaling. MAC-CE, or SCellDeactivationTimer | No new signaling or behavior required: DCI to switch to dormant BWP, or bwp-InactivityTimer (used to configure dormant BWP as default BWP) |
| Deactivated state | Legacy signaling: MAC-CE for activation | | No direct transition (no new signaling or behavior): Network first uses MAC-CE to activate SCell, and then uses DCI to switch UE to dormant BWP |
| Dormancy (dormant BWP) | New signaling or behavior required: Alt-1: new DCI signaling for cross-carrier BWP switch Alt-2: implicit BWP switch | Legacy signaling. MAC-CE, or SCellDeactivationTimer | |

The introduced signaling or behavior is for the transition from dormancy to activated state because a UE 115 may not be expected to receive DCI in a dormant BWP. Thus, in one example, the UE 115 may receive DCI for a cross-carrier BWP switch from a base station on a PCell or PSCell. In another example, the UE 115 may support an implicit BWP switch. In this example, the UE 115 may switch to or from an SCell dormant BWP based on an active BWP status on a PCell. For instance, one BWP on the PCell may be designated as the power saving BWP, and when this BWP is active, the UE 115 may implicitly switch from an SCell active BWP to the dormant BWP (e.g., as illustrated in FIG. 8). The power saving BWP may be the same as the default BWP on the PCell, so that, upon BWP timer expiry, SCells may be switched to the dormant BWP. For improved flexibility, the set of SCells affected by the implicit switching may also be RRC configured. The signaling or behavior for supporting the other state transitions may remain the same. Further, the SCell activation latency (e.g., from dormancy to activated state) may be reduced since the BWP switching delay may be shorter compared with an SCell state transition, which may be $1/3$ ms in 15 kHz depending on UE capability (e.g., type1 or type2 UE).

Figure 10:
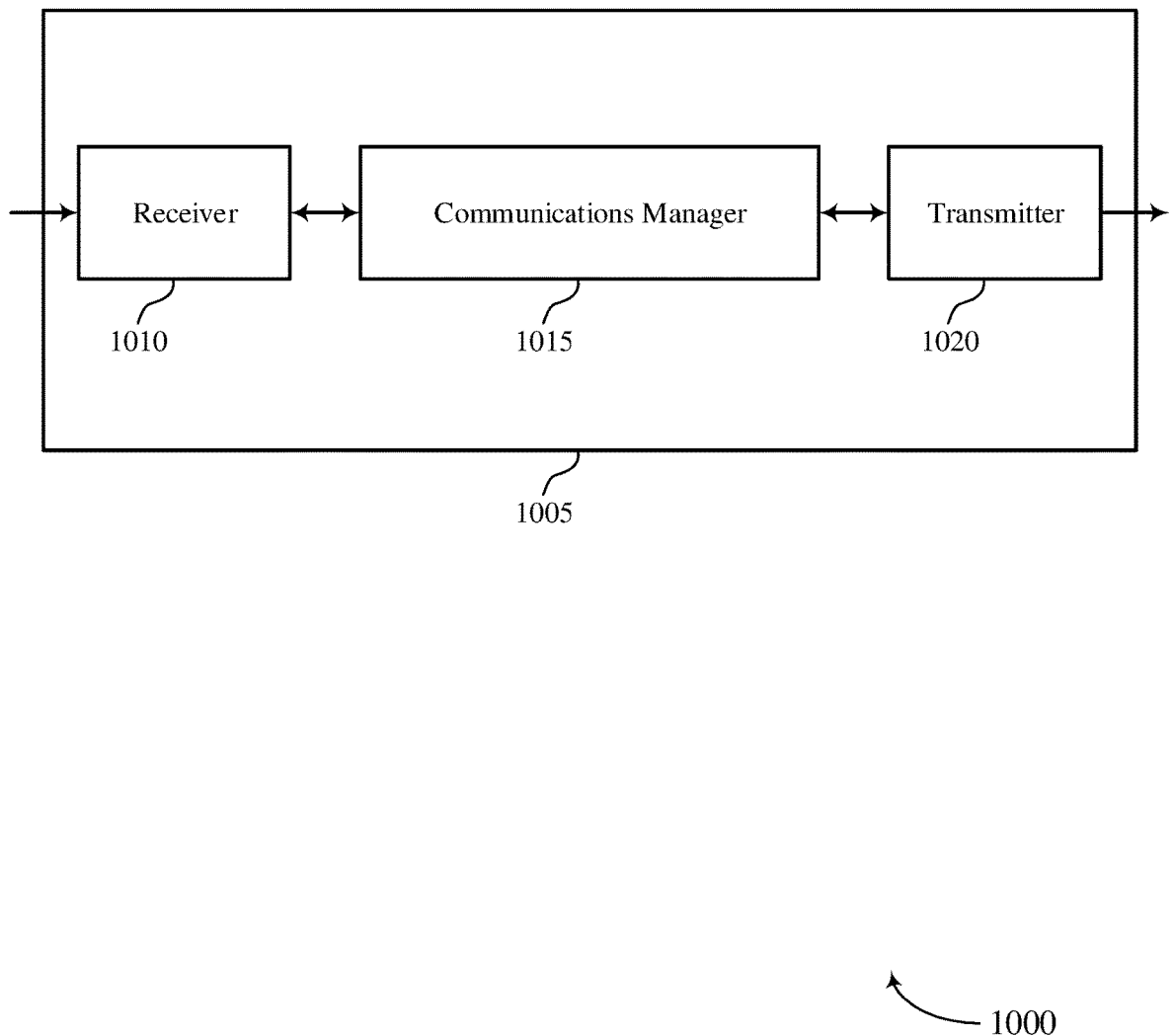
FIGS. 10 and 11 show block diagrams of devices that support performing measurements on deactivated SCells in accordance with aspects of the present disclosure.

FIG. 10 shows a block diagram 1000 of a device 1005 that supports performing measurements on deactivated SCells in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to performing measurements on deactivated SCells, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may communicate with a base station on a first BWP of a set of BWPs on an SCell, switch from the first BWP to a second BWP of the set of BWPs for performing channel state measurements, beam management, AGC maintenance, or MIB reading on the SCell based on the deactivating, and perform at least one of the channel state measurements, beam management, AGC maintenance, or MIB reading on the second BWP on the SCell. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
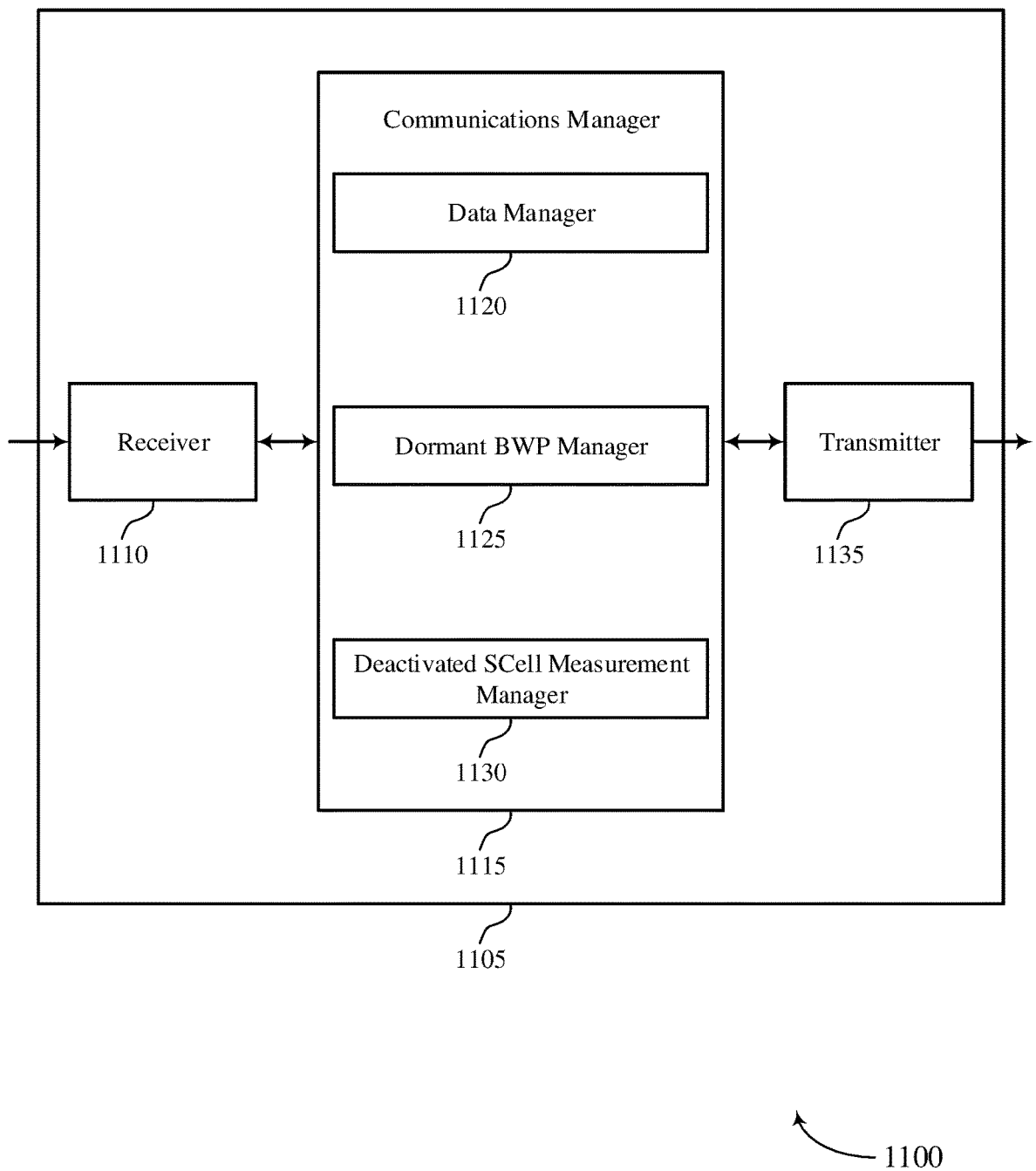

FIG. 11 shows a block diagram 1100 of a device 1105 that supports performing measurements on deactivated SCells in accordance with aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to performing measurements on deactivated SCells, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a data manager 1120, a dormant BWP manager 1125, and a deactivated SCell measurement manager 1130. The communications manager 1115 may be an example of aspects of the communications manager 1310 described herein.

The data manager 1120 may communicate with a base station on a first BWP of a set of BWPs on an SCell. The dormant BWP manager 1125 may switch from the first BWP to a second BWP of the set of BWPs for performing channel state measurements, beam management, AGC maintenance, or MIB reading on the SCell based on the deactivating. The deactivated SCell measurement manager 1130 may perform at least one of the channel state measurements, beam management, AGC maintenance, or MIB reading on the second BWP on the SCell.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
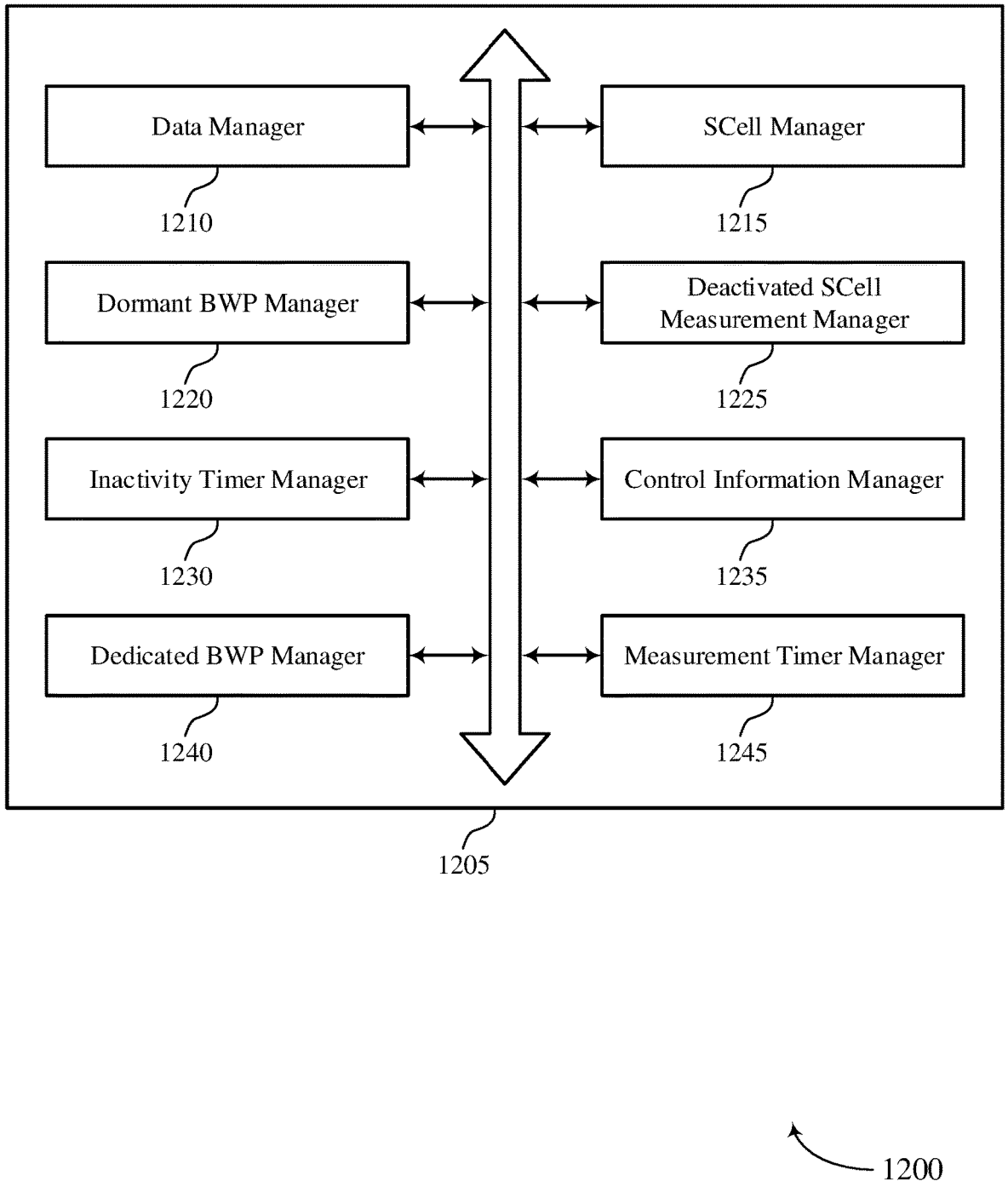
FIG. 12 shows a block diagram of a communications manager that supports performing measurements on deactivated SCells in accordance with aspects of the present disclosure.

FIG. 12 shows a block diagram 1200 of a communications manager 1205 that supports performing measurements on deactivated SCells in accordance with aspects of the present disclosure. The communications manager 1205 may be an example of aspects of a communications manager 1015, a communications manager 1115, or a communications manager 1310 described herein. The communications manager 1205 may include a data manager 1210, an SCell manager 1215, a dormant BWP manager 1220, a deactivated SCell measurement manager 1225, an inactivity timer manager 1230, a control information manager 1235, a dedicated BWP manager 1240, and a measurement timer manager 1245. Each of these modules may communicate, directly or indirectly, with one another (e.g., via one or more buses).

The data manager 1210 may communicate with a base station on a first BWP of a set of BWPs on an SCell. The dormant BWP manager 1220 may switch from the first BWP to a second BWP of the set of BWPs for performing channel state measurements, beam management, AGC maintenance, or MIB reading on the SCell based on the deactivating. The deactivated SCell measurement manager 1225 may perform at least one of the channel state measurements, beam management, AGC maintenance, or MIB reading on the second BWP on the SCell.

In some examples, the SCell is in an activated state prior to switching to the second BWP. The SCell manager 1215 may determine that the UE is to deactivate the SCell prior to switching to the second BWP. The SCell manager 1215 may then deactivate the SCell based on the determining, where deactivating the SCell includes transitioning the SCell to a deactivated state. In some examples, the inactivity timer manager 1230 may determine that an inactivity timer for communicating on the first BWP of the SCell has expired, and the SCell manager 1215 may determine that the UE is to deactivate the SCell based on the inactivity timer expiring. In some examples, the inactivity timer manager 1230 may start the inactivity timer upon activating the SCell or switching to the first BWP. In some examples, the inactivity timer manager 1230 may stop the inactivity timer during data transmissions on the first BWP of the SCell.

In some examples, the control information manager 1235 may receive a control message indicating that the UE is to deactivate the SCell, and the SCell manager 1215 may determine that the UE is to deactivate the SCell based on the control message. In some examples, the control message further indicates that the UE is to enter dormancy on the deactivated SCell. In such examples, the dormant BWP manager 1220 may switch to the second BWP based on the control message indicating that the UE is to enter dormancy on the deactivated SCell. In some cases, the control message includes an RRC message or a MAC-CE. In some examples, the control information manager 1235 may receive, on a PCell or a PSCell from the base station, an indication to switch to the second BWP for performing the at least one of the channel state measurements, beam management, AGC maintenance, or MIB reading. In such examples, the dormant BWP manager 1220 may switch from the first BWP to the second BWP based on receiving the indication to switch to the second BWP. In some examples, the dormant BWP manager 1220 may autonomously switch from the first BWP to the second BWP.

In some examples, the SCell is deactivated before switching to the second BWP. In such examples, the SCell manager 1215 may determine that the UE is to activate the SCell after performing the at least one of the channel state measurements, beam management, AGC maintenance, or MIB reading on the second BWP on the SCell, and the SCell manager 1215 may activate the SCell based on the determining, where activating the SCell includes transitioning the SCell to an activated state. In some examples, the control information manager 1235 may receive, on a PCell or a PSCell from the base station, an indication to switch to a first active BWP for communicating with the base station. In such examples, the dedicated BWP manager 1240 may switch from the second BWP to the first active BWP based on receiving the indication to switch to the first active BWP, where the first active BWP is the same as or different from the first BWP. In some examples, the dedicated BWP manager 1240 may autonomously switch from the second BWP to the first active BWP, where the first active BWP is the same as or different from the first BWP.

The measurement timer manager 1245 may determine that a measurement timer for performing the at least one of the channel state measurements, beam management, AGC maintenance, or MIB reading on the second BWP on the SCell has expired. In such examples, the deactivated SCell measurement manager 1225 may refrain from performing further channel state measurements, beam management, AGC maintenance, or MIB reading on the second BWP based on the measurement timer expiring. In some examples, the measurement timer manager 1245 may start the measurement timer upon switching to the second BWP. In some examples, the dormant BWP manager 1220 may receive RRC signaling identifying the second BWP for performing the channel state measurements, beam management, AGC maintenance, or MIB reading. In some cases, the RRC signaling further indicates a configuration for performing the at least one of the channel state measurements, beam management, AGC maintenance, or MIB reading on the second BWP. In some cases, the configuration indicates a periodicity for performing at least one of the channel state measurements or the beam management.

In some examples, the deactivated SCell measurement manager 1225 may receive an SSB or a CSI reference signal on the second BWP after switching to the second BWP. In some examples, the deactivated SCell measurement manager 1225 may perform the channel state measurements, beam management, AGC maintenance, or MIB reading based on the SSB or the CSI reference signal. In some cases, the first BWP includes a dedicated BWP, and the second BWP includes a dormant BWP. In some examples, the deactivated SCell measurement manager 1225 may determine that the UE is capable of performing channel state measurements, beam management, AGC maintenance, and MIB reading on the second BWP on the SCell after deactivating the SCell. In some examples, the deactivated SCell measurement manager 1225 may perform the at least one of the channel state measurements, beam management, AGC maintenance, or MIB reading on the second BWP on the SCell based on the determining.

Figure 13:
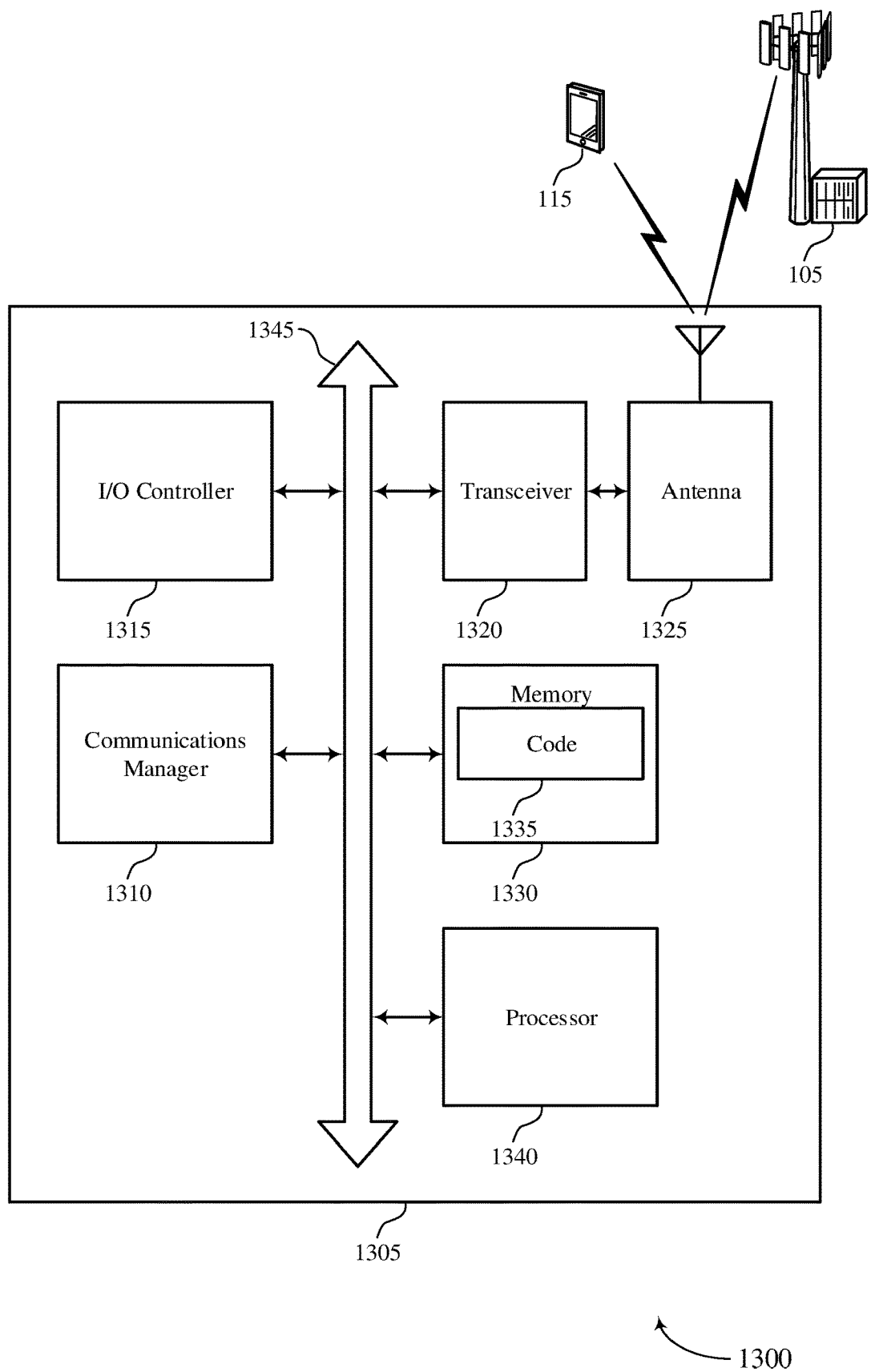
FIG. 13 shows a diagram of a system including a device that supports performing measurements on deactivated SCells in accordance with aspects of the present disclosure.

FIG. 13 shows a diagram of a system 1300 including a device 1305 that supports performing measurements on deactivated SCells in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may communicate with a base station on a first BWP of a set of BWPs on an SCell, switch from the first BWP to a second BWP of the set of BWPs for performing channel state measurements, beam management, AGC maintenance, or MIB reading on the SCell based on the deactivating, and perform at least one of the channel state measurements, beam management, AGC maintenance, or MIB reading on the second BWP on the SCell.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a binary input output system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting performing measurements on deactivated SCells).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
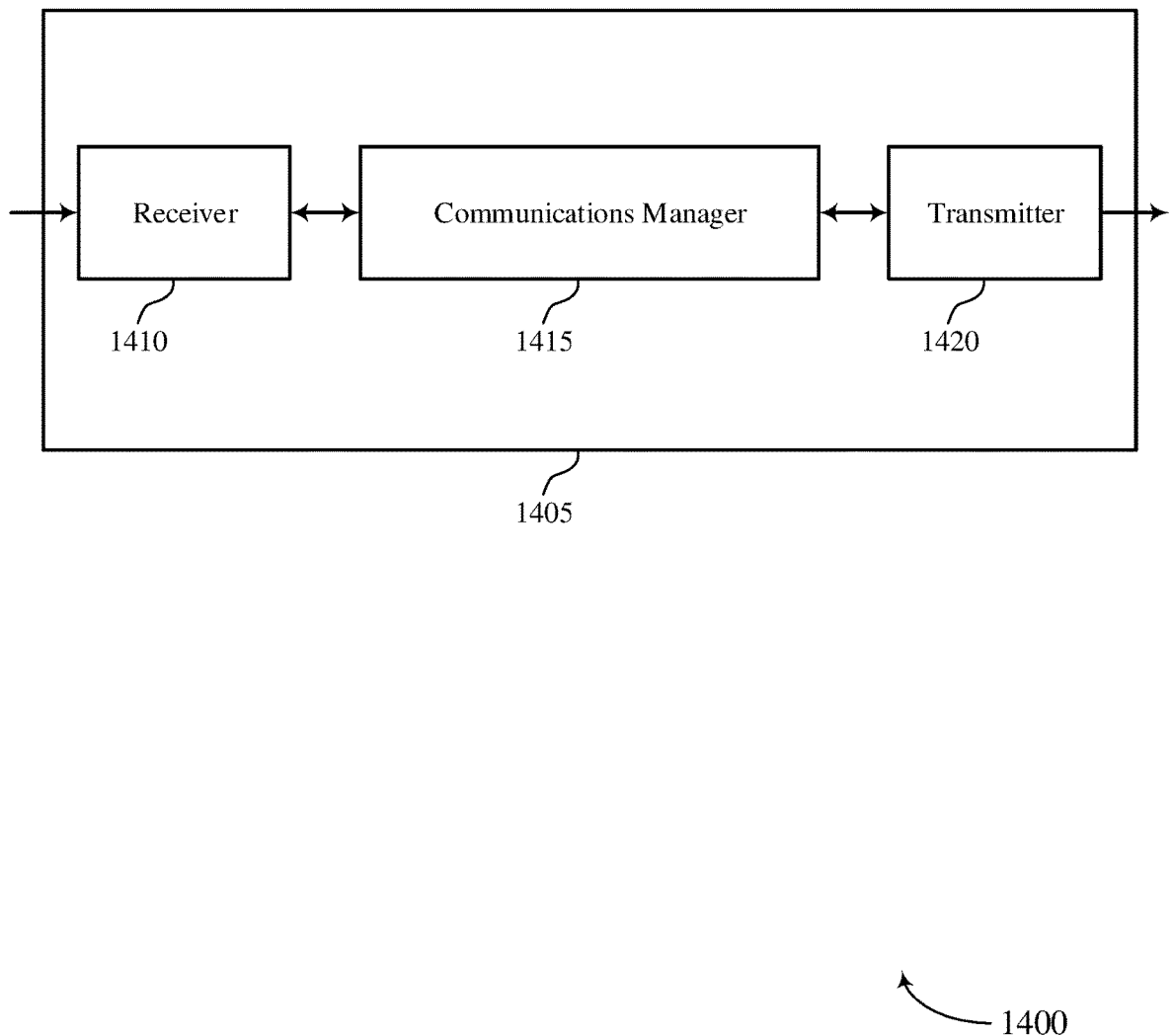
FIGS. 14 and 15 show block diagrams of devices that support performing measurements on deactivated SCells in accordance with aspects of the present disclosure.

FIG. 14 shows a block diagram 1400 of a device 1405 that supports performing measurements on deactivated SCells in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to performing measurements on deactivated SCells, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may communicate with a UE on a first BWP of a set of BWPs on an SCell, and transmit, to the UE on a PCell or a PSCell, an indication for the UE to switch to a second BWP of the set of BWPs for performing at least one of channel state measurements, beam management, AGC maintenance, or MIB reading on the SCell. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
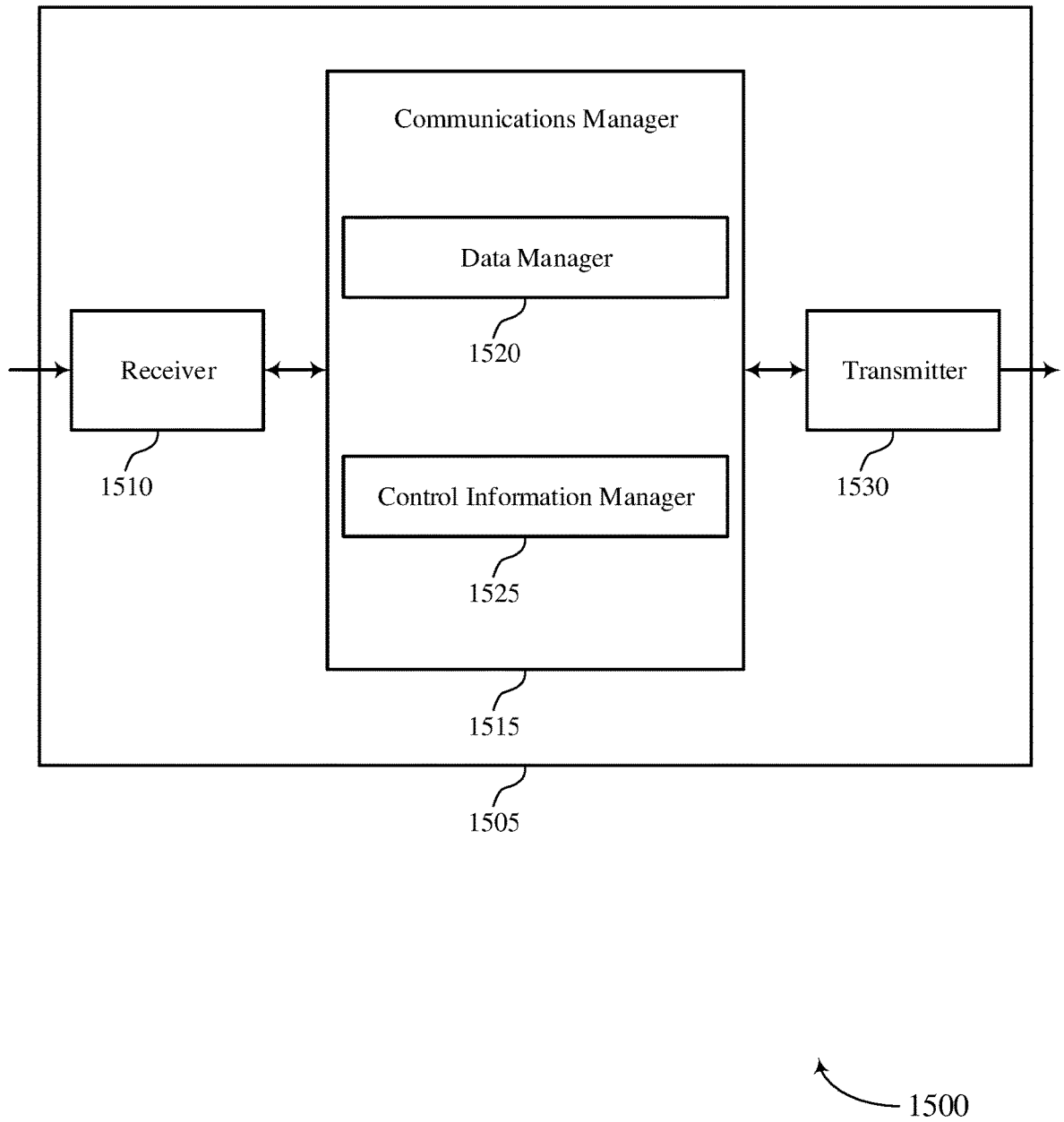

FIG. 15 shows a block diagram 1500 of a device 1505 that supports performing measurements on deactivated SCells in accordance with aspects of the present disclosure. The device 1505 may be an example of aspects of a device 1405, or a base station 105 as described herein. The device 1505 may include a receiver 1510, a communications manager 1515, and a transmitter 1530. The device 1505 may also include a processor. Each of these components may be in communication with one another (e.g., via one or more buses).

The receiver 1510 may receive information such as packets, user data, or control information associated with various information channels (e.g., control channels, data channels, and information related to performing measurements on deactivated SCells, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a data manager 1520 and a control information manager 1525. The communications manager 1515 may be an example of aspects of the communications manager 1710 described herein.

The data manager 1520 may communicate with a UE on a first BWP of a set of BWPs on an SCell. The control information manager 1525 may transmit, to the UE on a PCell or a PSCell, an indication for the UE to switch to a second BWP of the set of BWPs for performing at least one of channel state measurements, beam management, AGC maintenance, or MIB reading on the SCell.

The transmitter 1530 may transmit signals generated by other components of the device 1505. In some examples, the transmitter 1530 may be collocated with a receiver 1510 in a transceiver module. For example, the transmitter 1530 may be an example of aspects of the transceiver 1720 described with reference to FIG. 17. The transmitter 1530 may utilize a single antenna or a set of antennas.

Figure 16:
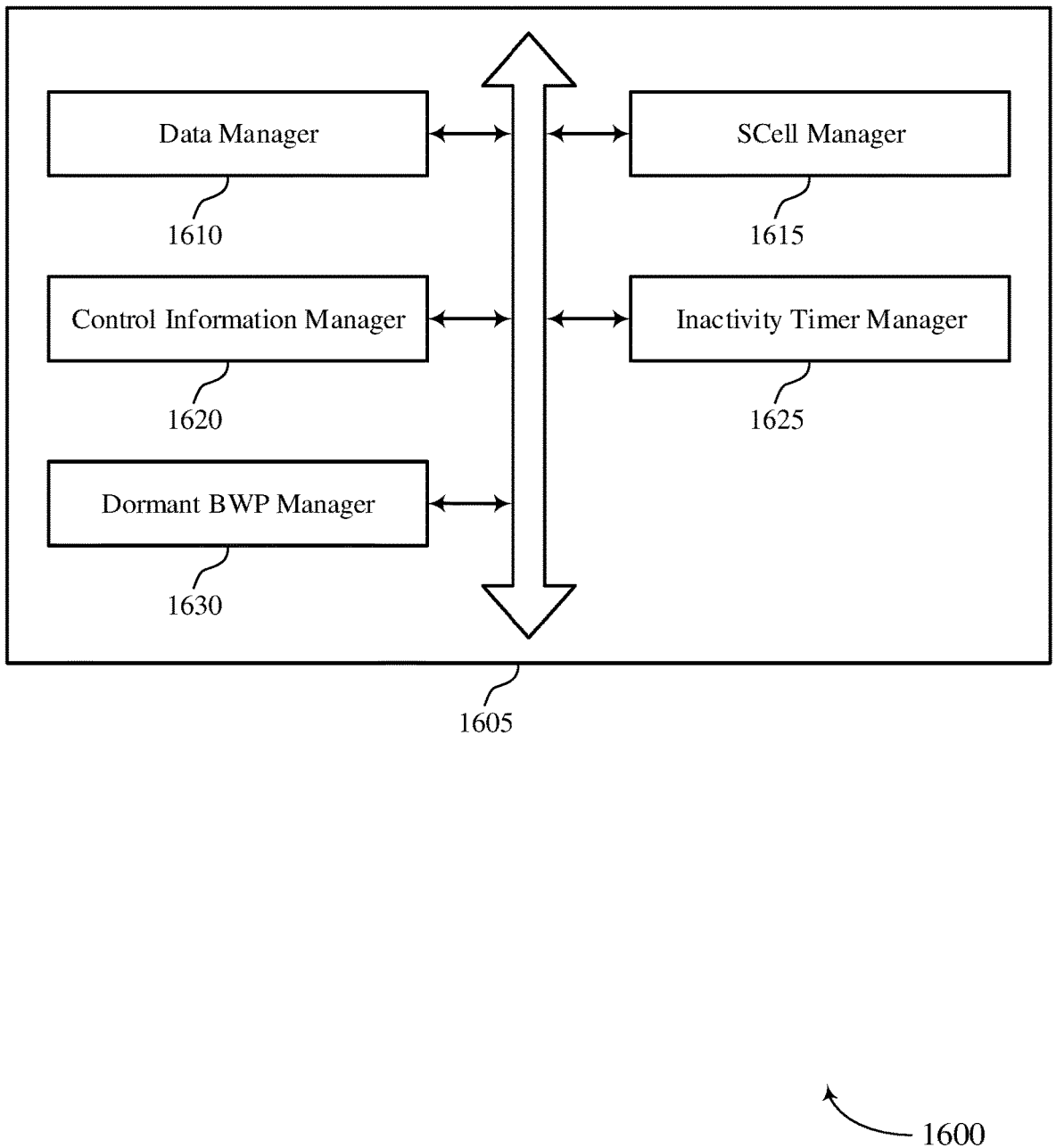
FIG. 16 shows a block diagram of a communications manager that supports performing measurements on deactivated SCells in accordance with aspects of the present disclosure.

FIG. 16 shows a block diagram 1600 of a communications manager 1605 that supports performing measurements on deactivated SCells in accordance with aspects of the present disclosure. The communications manager 1605 may be an example of aspects of a communications manager 1415, a communications manager 1515, or a communications manager 1710 described herein. The communications manager 1605 may include a data manager 1610, an SCell manager 1615, a control information manager 1620, an inactivity timer manager 1625, and a dormant BWP manager 1630. Each of these modules may communicate, directly or indirectly, with one another (e.g., via one or more buses).

The data manager 1610 may communicate with a UE on a first BWP of a set of BWPs on an SCell. The control information manager 1620 may transmit, to the UE on a PCell or a PSCell, an indication for the UE to switch to a second BWP of the set of BWPs for performing at least one of channel state measurements, beam management, AGC maintenance, or MIB reading on the SCell. The SCell manager 1615 may determine that the SCell is to be deactivated, and the control information manager 1620 may transmit a control message indicating that the UE is to deactivate the SCell and enter dormancy on the deactivated SCell based on the determining.

The inactivity timer manager 1625 may determine that an inactivity timer for communicating on the first BWP of the SCell has expired. In some examples, the SCell manager 1615 may determine that the SCell is to be deactivated based on the inactivity timer expiring. In some examples, the inactivity timer manager 1625 may start the inactivity timer upon activating the SCell or switching to the first BWP. In some examples, the inactivity timer manager 1625 may stop the inactivity timer during data transmissions on the first BWP of the SCell. In some examples, the SCell manager 1615 may determine that the UE is to activate the SCell after performing the at least one of the channel state measurements, beam management, AGC maintenance, or MIB reading on the second BWP on the SCell. In some examples, the control information manager 1620 may transmit, to the UE on the PCell or the PSCell, another indication for the UE to switch to a first active BWP for communicating with the base station, where the first active BWP is the same as or different from the first BWP.

The dormant BWP manager 1630 may transmit RRC signaling identifying the second BWP on which the UE is to perform the channel state measurements, beam management, AGC maintenance, or MIB reading. In some cases, the RRC signaling further indicates a configuration for performing the at least one of the channel state measurements, beam management, AGC maintenance, or MIB reading on the second BWP. In some cases, the configuration indicates a periodicity for performing at least one of the channel state measurements or the beam management. In some cases, the first BWP includes a dedicated BWP, and the second BWP includes a dormant BWP. In some cases, the control message includes an RRC message or a MAC-CE. In some cases, the indication for the UE to switch to the second BWP is included in DCI.

Figure 17:
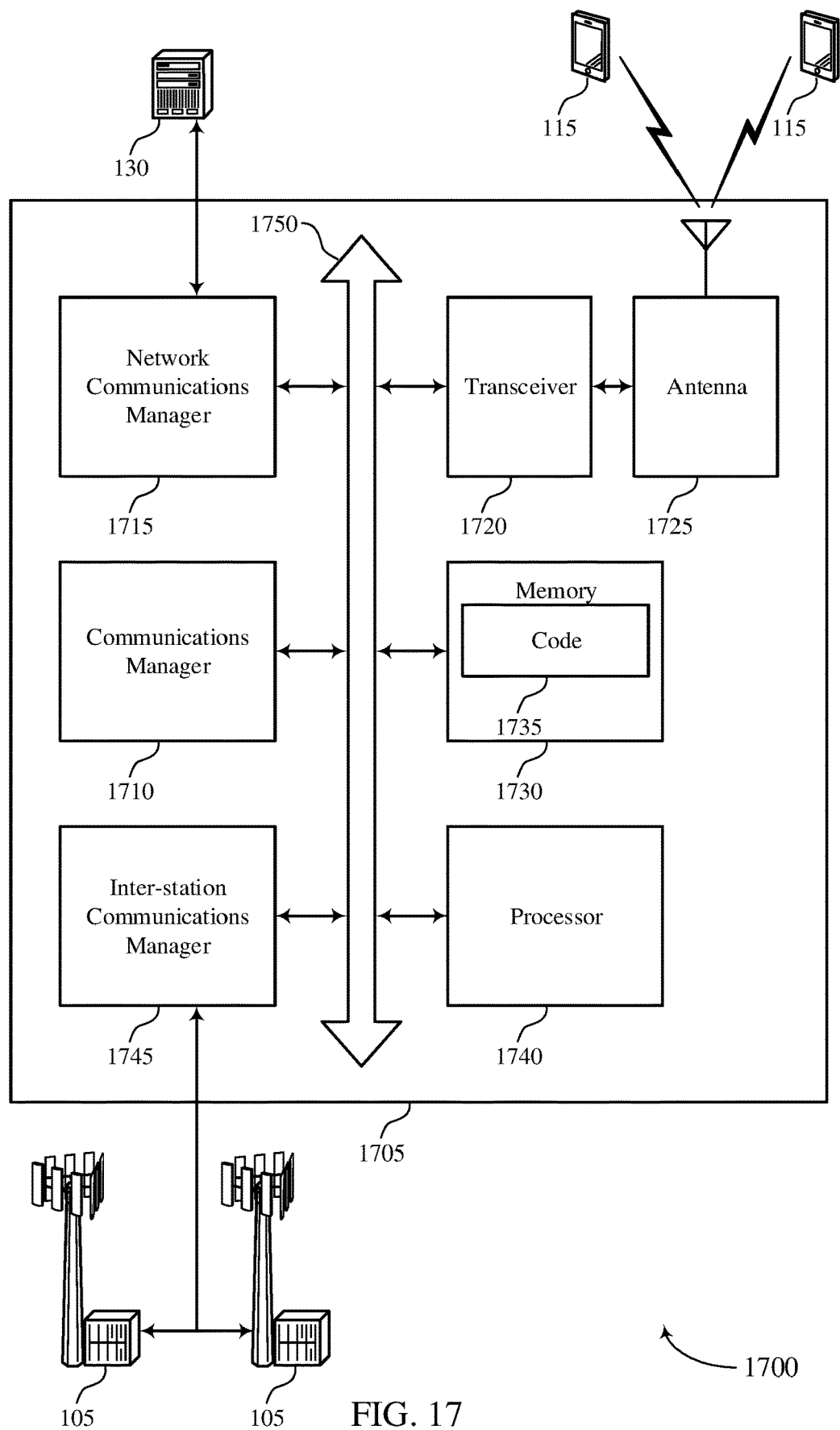
FIG. 17 shows a diagram of a system including a device that supports performing measurements on deactivated SCells in accordance with aspects of the present disclosure.

FIG. 17 shows a diagram of a system 1700 including a device 1705 that supports performing measurements on deactivated SCells in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may communicate with a UE on a first BWP of a set of BWPs on an SCell, and transmit, to the UE on a PCell or a PSCell, an indication for the UE to switch to a second BWP of the set of BWPs for performing at least one of channel state measurements, beam management, AGC maintenance, or MIB reading on the SCell.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting performing measurements on deactivated SCells).

The inter-station communications manager 1745 may manage communications with other base station 105 and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
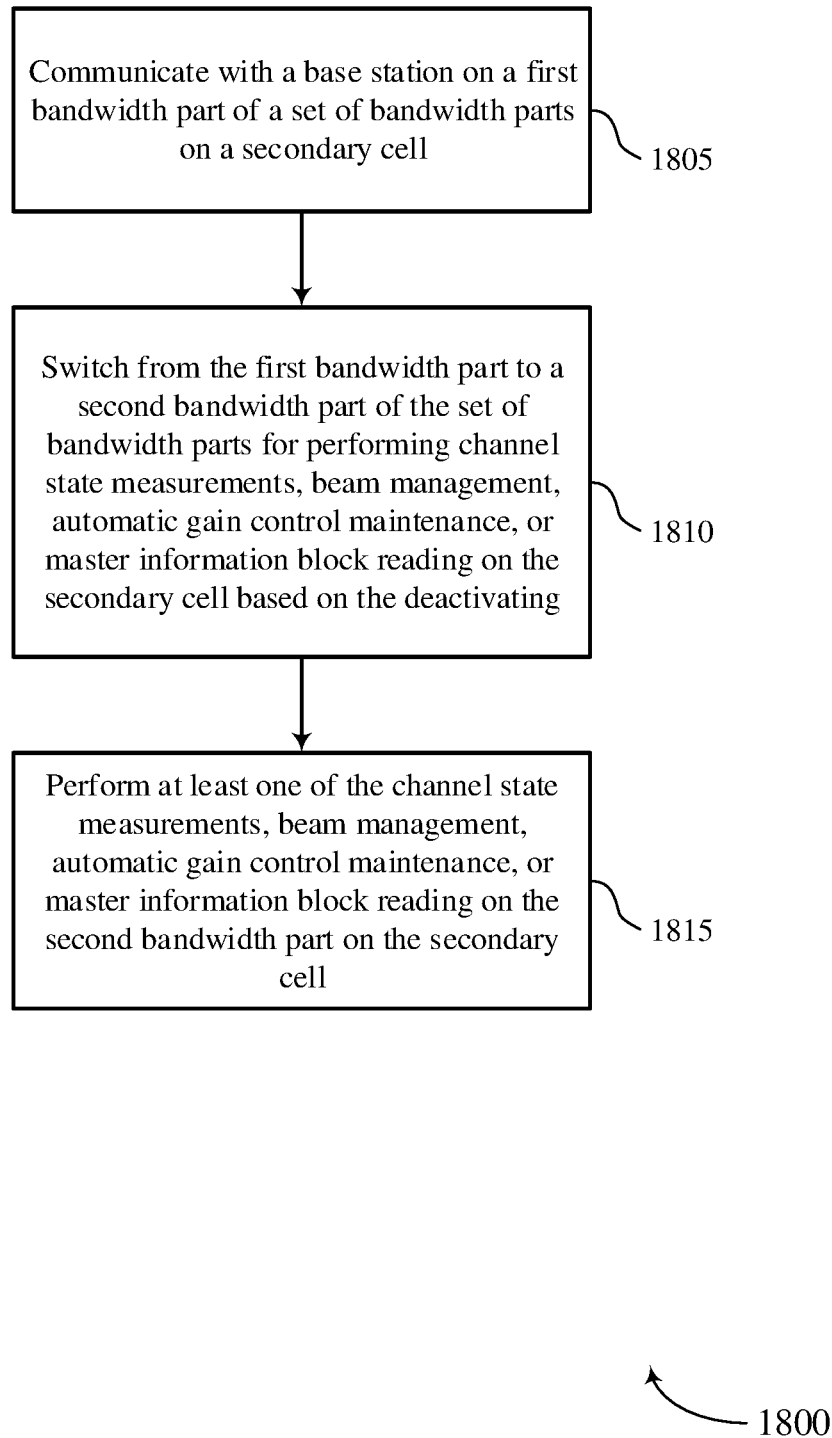
FIGS. 18 and 19 show flowcharts illustrating methods that support performing measurements on deactivated SCells in accordance with aspects of the present disclosure.

FIG. 18 shows a flowchart illustrating a method 1800 that supports performing measurements on deactivated SCells in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally, or alternatively, a UE may perform aspects of the functions described below using special-purpose hardware.

At 1805, the UE may communicate with a base station on a first BWP of a set of BWPs on an SCell. The operations of 1805 may be performed according to the methods described herein. In some examples, aspects of the operations of 1805 may be performed by a data manager as described with reference to FIGS. 10 through 13.

At 1810, the UE may switch from the first BWP to a second BWP of the set of BWPs for performing channel state measurements, beam management, AGC maintenance, or MIB reading on the SCell based on the deactivating. The operations of 1810 may be performed according to the methods described herein. In some examples, aspects of the operations of 1810 may be performed by a dormant BWP manager as described with reference to FIGS. 10 through 13.

At 1815, the UE may perform at least one of the channel state measurements, beam management, AGC maintenance, or MIB reading on the second BWP on the SCell. The operations of 1815 may be performed according to the methods described herein. In some examples, aspects of the operations of 1815 may be performed by a deactivated SCell measurement manager as described with reference to FIGS. 10 through 13.

Figure 19:
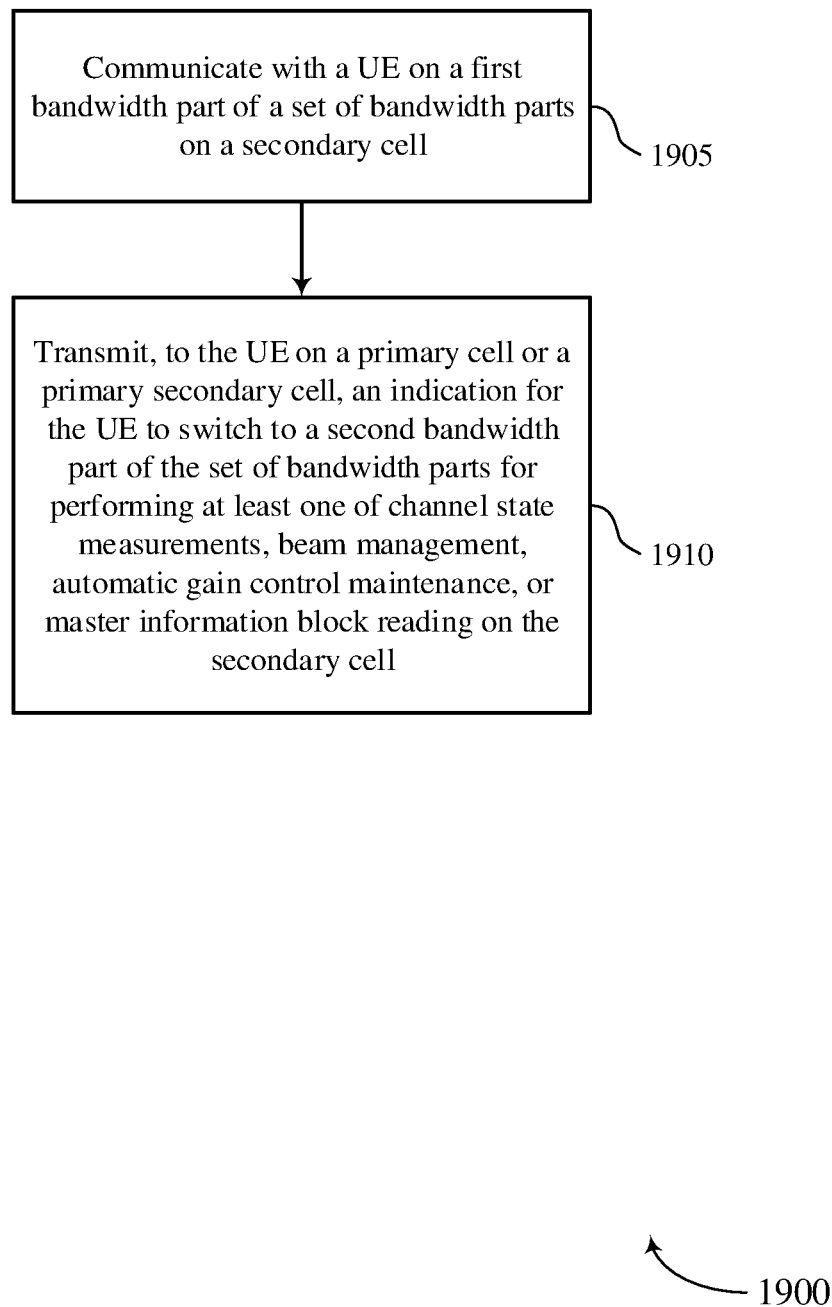

FIG. 19 shows a flowchart illustrating a method 1900 that supports performing measurements on deactivated SCells in accordance with aspects of the present disclosure. The operations of method 1900 may be implemented by a base station 105 or its components as described herein. For example, the operations of method 1900 may be performed by a communications manager as described with reference to FIGS. 14 through 17. In some examples, a base station may execute a set of instructions to control the functional elements of the base station to perform the functions described below. Additionally, or alternatively, a base station may perform aspects of the functions described below using special-purpose hardware.

At 1905, the base station may communicate with a UE on a first BWP of a set of BWPs on an SCell. The operations of 1905 may be performed according to the methods described herein. In some examples, aspects of the operations of 1905 may be performed by a data manager as described with reference to FIGS. 14 through 17.

At 1910, the base station may transmit, to the UE on a PCell or a PSCell, an indication for the UE to switch to a second BWP of the set of BWPs for performing at least one of channel state measurements, beam management, AGC maintenance, or MIB reading on the SCell. The operations of 1910 may be performed according to the methods described herein. In some examples, aspects of the operations of 1910 may be performed by a control information manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   communicating with a network entity on a first bandwidth part of a plurality of bandwidth parts on an active secondary cell;
   switching from the first bandwidth part to a second dormant bandwidth part of the plurality of bandwidth parts on the active secondary cell for performing channel state measurements, beam management, automatic gain control maintenance, or master information block reading on the active secondary cell; and
   performing at least one of the channel state measurements, beam management, automatic gain control maintenance, or master information block reading on the second dormant bandwidth part on the active secondary cell.

2. The method of claim 1, wherein switching from the first bandwidth part to the second dormant bandwidth part comprises:
   receiving, on a primary cell or a primary secondary cell from the network entity, an indication to switch to the second dormant bandwidth part for performing the at least one of the channel state measurements, beam management, automatic gain control maintenance, or master information block reading; and
   switching from the first bandwidth part to the second dormant bandwidth part based at least in part on receiving the indication to switch to the second dormant bandwidth part.

3. The method of claim 1, wherein switching from the first bandwidth part to the second dormant bandwidth part comprises:
   autonomously switching from the first bandwidth part to the second dormant bandwidth part.

4. The method of claim 1, further comprising:
   determining that a measurement timer for performing the at least one of the channel state measurements, beam management, automatic gain control maintenance, or master information block reading on the second dormant bandwidth part on the active secondary cell has expired; and
   refraining from performing further channel state measurements, beam management, automatic gain control maintenance, or master information block reading on the second dormant bandwidth part based at least in part on the measurement timer expiring.

5. The method of claim 4, further comprising:
   starting the measurement timer upon switching to the second dormant bandwidth part.

6. The method of claim 1, further comprising:
   receiving radio resource control signaling identifying the second dormant bandwidth part for performing the channel state measurements, beam management, automatic gain control maintenance, or master information block reading.

7. The method of claim 6, wherein the radio resource control signaling further indicates a configuration for performing the at least one of the channel state measurements, beam management, automatic gain control maintenance, or master information block reading on the second dormant bandwidth part.

8. The method of claim 7, wherein the configuration indicates a periodicity for performing at least one of the channel state measurements or the beam management.

9. The method of claim 1, further comprising:
receiving a synchronization signal block or a channel state information reference signal on the second dormant bandwidth part after switching to the second dormant bandwidth part; and
performing the channel state measurements, beam management, automatic gain control maintenance, or master information block reading based at least in part on the synchronization signal block or the channel state information reference signal.

10. The method of claim 1, wherein the first bandwidth part comprises a dedicated bandwidth part.

11. The method of claim 1, further comprising:
determining that the UE is capable of performing channel state measurements, beam management, automatic gain control maintenance, and master information block reading on the second dormant bandwidth part on the active secondary cell; and
performing the at least one of the channel state measurements, beam management, automatic gain control maintenance, or master information block reading on the second dormant bandwidth part on the active secondary cell based at least in part on the determining.

12. A method for wireless communication at a network entity, comprising:
communicating with a user equipment (UE) on a first bandwidth part of a plurality of bandwidth parts on an active secondary cell; and
transmitting, to the UE on a primary cell or a primary secondary cell, an indication for the UE to switch to a second dormant bandwidth part of the plurality of bandwidth parts for performing at least one of channel state measurements, beam management, automatic gain control maintenance, or master information block reading on the active secondary cell.

13. The method of claim 12, further comprising:
transmitting radio resource control signaling identifying the second dormant bandwidth part on which the UE is to perform the channel state measurements, beam management, automatic gain control maintenance, or master information block reading.

14. The method of claim 13, wherein the radio resource control signaling further indicates a configuration for performing the at least one of the channel state measurements, beam management, automatic gain control maintenance, or master information block reading on the second dormant bandwidth part.

15. The method of claim 14, wherein the configuration indicates a periodicity for performing at least one of the channel state measurements or the beam management.

16. A user equipment (UE), comprising:
one or more memories storing processor-executable code; and
one or more processors coupled with the one or more memories and individually or collectively operable to execute the code to cause the UE to:
communicate with a network entity on a first bandwidth part of a plurality of bandwidth parts on an active secondary cell;
switch from the first bandwidth part to a second dormant bandwidth part of the plurality of bandwidth parts for performing channel state measurements, beam management, automatic gain control maintenance, or master information block reading on the active secondary cell; and
perform at least one of the channel state measurements, beam management, automatic gain control maintenance, or master information block reading on the second dormant bandwidth part on the active secondary cell.

17. A network entity, comprising:
one or more memories storing processor-executable code; and
one or more processors coupled with the one or more memories and individually or collectively operable to execute the code to cause the network entity to:
communicate with a user equipment (UE) on a first bandwidth part of a plurality of bandwidth parts on an active secondary cell; and
transmit, to the UE on a primary cell or a primary secondary cell, an indication for the UE to switch to a second dormant bandwidth part of the plurality of bandwidth parts for performing at least one of channel state measurements, beam management, automatic gain control maintenance, or master information block reading on the active secondary cell.

18. The UE of claim 16, wherein, to switch from the first bandwidth part to the second dormant bandwidth part, the one or more processors are individually or collectively operable to execute the code to cause the UE to:
receive, on a primary cell or a primary secondary cell from the network entity, an indication to switch to the second dormant bandwidth part for performing the at least one of the channel state measurements, beam management, automatic gain control maintenance, or master information block reading; and
switch from the first bandwidth part to the second dormant bandwidth part based at least in part on receiving the indication to switch to the second dormant bandwidth part.

19. The UE of claim 16, wherein, to switch from the first bandwidth part to the second dormant bandwidth part, the one or more processors are individually or collectively operable to execute the code to cause the UE to:
autonomously switch from the first bandwidth part to the second dormant bandwidth part.

20. The UE of claim 16, wherein the one or more processors are individually or collectively further operable to execute the code to cause the UE to:
determine that a measurement timer for performing the at least one of the channel state measurements, beam management, automatic gain control maintenance, or master information block reading on the second dormant bandwidth part on the active secondary cell has expired; and
refrain from performing further channel state measurements, beam management, automatic gain control maintenance, or master information block reading on the second dormant bandwidth part based at least in part on the measurement timer expiring.

21. The UE of claim 20, wherein the one or more processors are individually or collectively further operable to execute the code to cause the UE to:
start the measurement timer upon switching to the second dormant bandwidth part.

22. The UE of claim 16, wherein the one or more processors are individually or collectively further operable to execute the code to cause the UE to:
receive radio resource control signaling identifying the second dormant bandwidth part for performing the channel state measurements, beam management, automatic gain control maintenance, or master information block reading.

23. The UE of claim 22, wherein the radio resource control signaling further indicates a configuration for performing the at least one of the channel state measurements, beam management, automatic gain control maintenance, or master information block reading on the second dormant bandwidth part.

24. The UE of claim 23, wherein the configuration indicates a periodicity for performing at least one of the channel state measurements or the beam management.

25. The UE of claim 16, wherein the one or more processors are individually or collectively further operable to execute the code to cause the UE to:
receive a synchronization signal block or a channel state information reference signal on the second dormant bandwidth part after switching to the second dormant bandwidth part; and
perform the channel state measurements, beam management, automatic gain control maintenance, or master information block reading based at least in part on the synchronization signal block or the channel state information reference signal.

26. The UE of claim 16, wherein the first bandwidth part comprises a dedicated bandwidth part.

27. The UE of claim 16, wherein the one or more processors are individually or collectively further operable to execute the code to cause the UE to:
determine that the UE is capable of performing channel state measurements, beam management, automatic gain control maintenance, and master information block reading on the second dormant bandwidth part on the active secondary cell; and
perform the at least one of the channel state measurements, beam management, automatic gain control maintenance, or master information block reading on the second dormant bandwidth part on the active secondary cell based at least in part on the determining.

28. The network entity of claim 17, wherein the one or more processors are individually or collectively further operable to execute the code to cause the network entity to:
transmit radio resource control signaling identifying the second dormant bandwidth part on which the UE is to perform the channel state measurements, beam management, automatic gain control maintenance, or master information block reading.

29. The network entity of claim 28, wherein the radio resource control signaling further indicates a configuration for performing the at least one of the channel state measurements, beam management, automatic gain control maintenance, or master information block reading on the second dormant bandwidth part.

30. The network entity of claim 29, wherein the configuration indicates a periodicity for performing at least one of the channel state measurements or the beam management.

* * * * *